United States Patent
Butler et al.

(10) Patent No.: US 9,357,493 B1
(45) Date of Patent: May 31, 2016

(54) STYLUS POWER MANAGEMENT USING MOTION AND ORIENTATION SENSING

(71) Applicant: Amazon Technologies, Inc., Seattle, WA (US)

(72) Inventors: David George Butler, San Jose, CA (US); Richard William Mincher, Cupertino, CA (US); Arvind Thiagarajan, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 26 days.

(21) Appl. No.: 14/541,655

(22) Filed: Nov. 14, 2014

(51) Int. Cl.
 *G06F 3/0346* (2013.01)
 *H04W 52/02* (2009.01)
 *G06F 3/0354* (2013.01)

(52) U.S. Cl.
 CPC ......... *H04W 52/0254* (2013.01); *G06F 3/0346* (2013.01); *G06F 3/03545* (2013.01)

(58) Field of Classification Search
 CPC ........... H04W 52/0254; G06F 3/03545; G06F 3/0346
 USPC ......................................................... 345/179
 See application file for complete search history.

(56) References Cited

U.S. PATENT DOCUMENTS

| 2010/0051356 | A1* | 3/2010 | Stern | G06F 3/03545 |
| | | | | 178/19.04 |
| 2012/0327042 | A1* | 12/2012 | Harley | G06F 3/044 |
| | | | | 345/179 |
| 2013/0229391 | A1* | 9/2013 | DiVerdi | G06F 3/0488 |
| | | | | 345/179 |
| 2014/0176495 | A1* | 6/2014 | Vlasov | G06F 3/044 |
| | | | | 345/174 |

FOREIGN PATENT DOCUMENTS

WO 2013165466 A1 11/2013

OTHER PUBLICATIONS

Hughes, Andrew. Active Pen Input and the Android Input Framework: A Thesis. MSEE Dissertation, California Polytechnic State University, 2011.
Purcher, Jack. Apple Wins Patent for inventing iPen Orientation Detection. Patently Apple. Jan. 28, 2014. http://www.patentlyapple.com/patently-apple/2014/01/apple-wins-patent-for-inventing-ipen-orientation-detection.html.
Microsoft's Multi-Purpose Stylus Features an Accelerometer, Interacts with Cameras, Speakers, and More. WinBeta. Jun. 24, 2014. http://www.winbeta.org/news/microsofts-multi-purpose-stylus-features-accelerometer-interacts-cameras-speakers-and-more.

* cited by examiner

Primary Examiner — Aneeta Yodichkas
Assistant Examiner — Chineyere Wills-Burns
(74) Attorney, Agent, or Firm — Seyfarth Shaw LLP; Ilan N. Barzilay; David A. Klein

(57) ABSTRACT

A system including an active stylus and a mobile computing device where an electronic signal emitted by the tip of the stylus that the mobile computing device uses to locate the tip is turned on and off when the stylus is not being used to save power. Whether the stylus is being used is determined based on an orientation of the stylus in comparison to an orientation of an electronic writing surface of the computing device. Difference in barometric air pressure or altitude between the stylus and mobile computing device may also be used to turn the tip signal on and off.

20 Claims, 15 Drawing Sheets

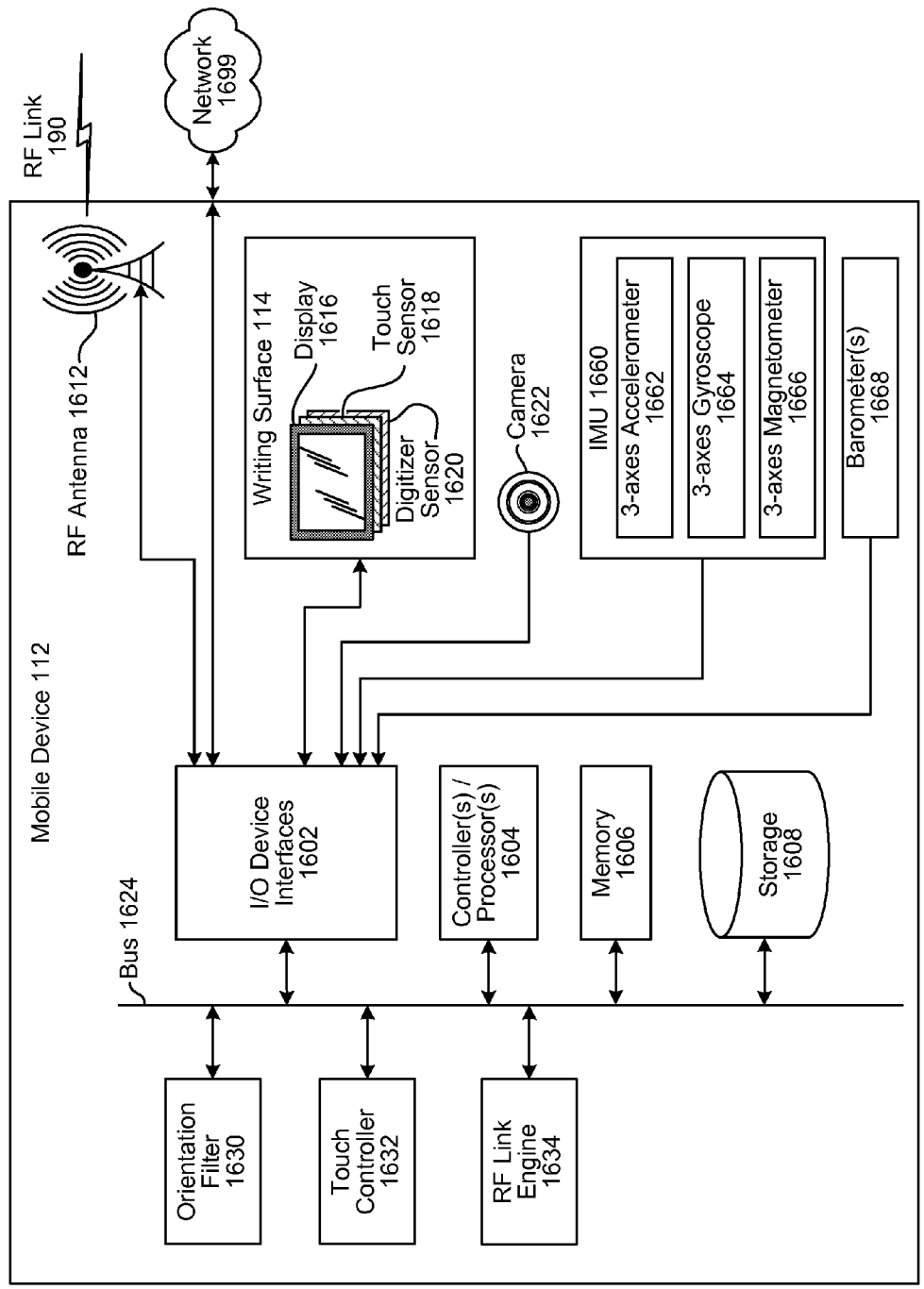

STYLUS POWER MANAGEMENT USING MOTION AND ORIENTATION SENSING

BACKGROUND

With the advancement of technology, the use and popularity of electronic devices, such as mobile devices, has increased considerably. Mobile devices, such as smart phones and tablet computers, typically have touchscreens that enable a user to operate the devices by touching the screen with a finger or stylus type device.

BRIEF DESCRIPTION OF DRAWINGS

For a more complete understanding of the present disclosure, reference is now made to the following description taken in conjunction with the accompanying drawings.

FIG. 16 is a block diagram conceptually illustrating example components of the mobile device.

DETAILED DESCRIPTION

A stylus may be used to write, draw and otherwise interact with a touchscreen or other surface of a computing device to provide input to applications and programs running on the computing device. "Active" styluses emit an electronic signal out of the tip that is received by a digitizer sensor array built into the screen of the computing device, allowing a touch controller of the computing device to precisely determine the position of the stylus tip. Position accuracy on contemporary devices is typically in fractions of a millimeter.

In comparison to "passive" styluses that essentially emulate a user's finger on the touch screen, active styluses provide increased functionality, such as enabling the computing device to detect a position of a hovering stylus tip that is not in contact with the touch screen, better discrimination between the tip and unwanted contact with the touch screen (e.g., by a user's palm as they write with the stylus), and additional functionality provided by electronics built into the stylus, such as allowing the user to change a color of virtual "ink" while writing on the computing device by actuating a switch on the stylus.

Active styluses have a higher power draw (e.g., 50-100×) when their tip is turned "on" versus turned "off." In order for a stylus user to begin note-taking or drawing instantly as the tip touches an electronic writing surface of the computing device (e.g., a touch-sensitive display of a mobile phone or tablet computer), the electronic signal emitted by the tip is typically kept turned on whenever the user is touching or holding the stylus. Continuous operation of the tip reduces the battery life of the stylus.

One solution to this problem has been to have the stylus turn off the signal emanating from its tip after a period of inactivity, and have the stylus turn on by having the user tap the tip against the touch screen to "wake" the stylus. While the stylus may wake a fraction of a second after the tip is tapped, this solution disrupts a writer's natural flow. Ideally, writing on an electronic writing surface should recreate the experience of writing on paper, enabling a writer to pick up a pen and start to write without the pen turning itself "off" each time the writer contemplatively fidgets.

Figure 1:
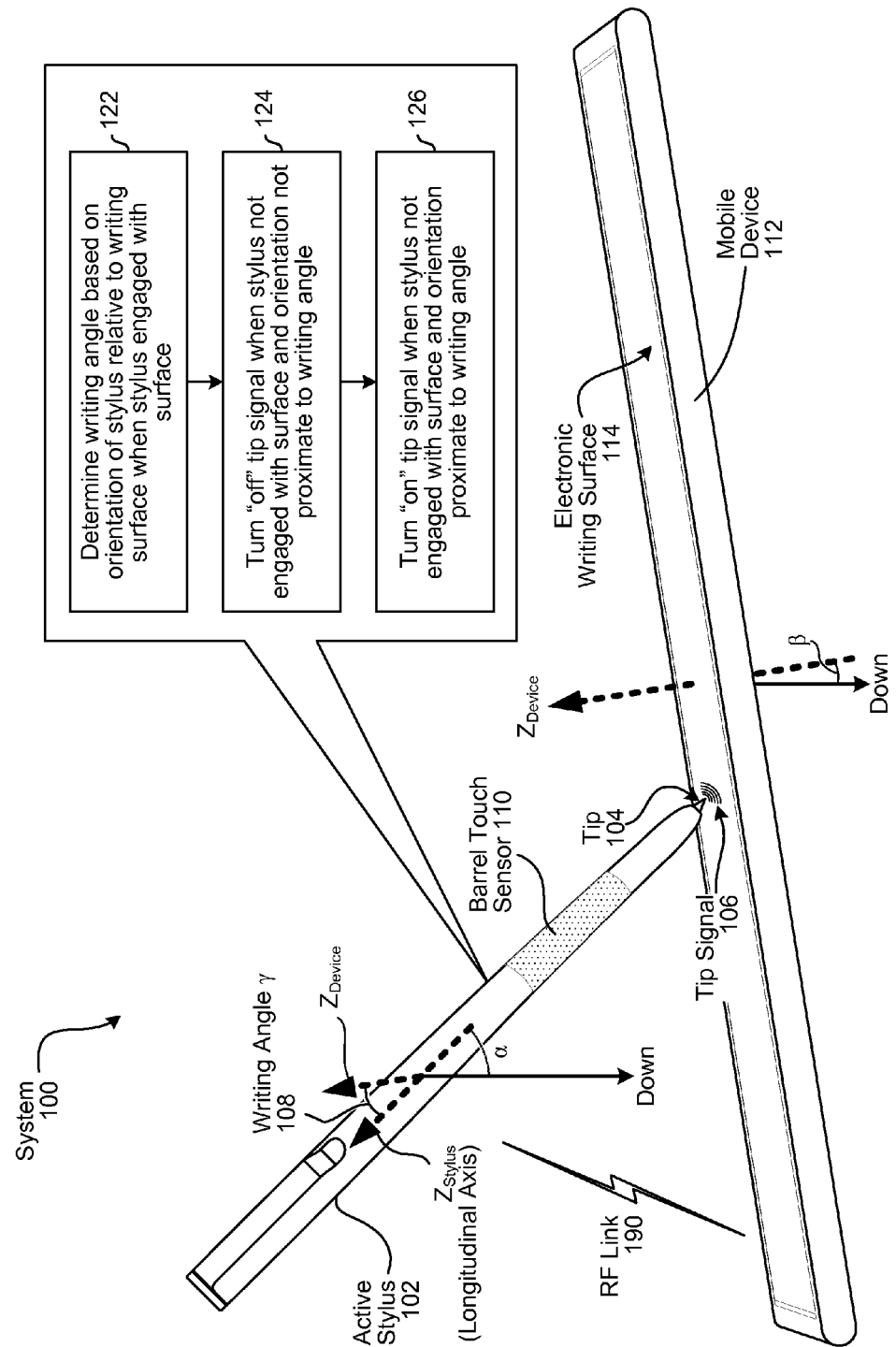
FIG. 1 illustrates a system for turning on and off a signal emitted by the tip of a stylus based on orientation of the stylus and/or mobile device.

FIG. 1 illustrates a system 100 including an active stylus 102 and a mobile computing device 112 where the electronic signal 106 emitted by an emitter in the tip 104 is turned on and off based on an orientation of the stylus in comparison to an orientation of the electronic writing surface 114. The tip emitter may be, among other things, a radio frequency (RF) transmitter which applies modulated RF energy to the tip 104, which itself may be or include a raw antenna element (e.g., a monopole antenna element). As an alternative to orientation, or in combination with orientation, a difference in barometric air pressure or altitude (e.g., absolute height relative to sea level) between the stylus 102 and mobile computing device 112 may be used to turn the tip 104 on and off.

When a person is preparing to write, they tend to hold the pen at a particular angle relative to the writing surface. Some people write with the pen held almost vertically. Others may hold it at almost a forty five degree angle. Using a negligible amount of power and accelerometers in the stylus 102 and mobile device 112, the angle of the stylus relative to the writing surface can be determined using occurrences of the tip 104 touching down. Occurrences of the tip 104 touching down may be determined based on a "tap" sensitive pressure sensor built into the tip and/or based on feedback from the mobile device 112. The pressure sensor may be, among other things, an electrically resistive force sensor.

When people stop writing, they tend to rotate their wrist to the side. The pen/stylus shifts to an angle that is closer to horizontal than it is to vertical. Some people will fidget while thinking of what to write next, such as putting the pen up to their mouth, or spinning the pen in their fingers. The motion and angles that the pen/stylus experiences when a writer is not writing can be distinguished from the motion and angles when the writer is—or is preparing to write.

Contemporary mobile computing devices typically include an Inertial Measurement Unit (IMU) to detect changes in motion. An IMU may include a three-axis gyroscope to measure rotational movement, a three-axis accelerometer to measure acceleration, and a three-axis magnetometer to provide compass direction. Compact barometric sensors may also be included to enable a computing device 112 to determine barometric pressure and/or altitude. For example, barometers included in some contemporary mobile devices can resolve changes in tenths of Pascals, which translates into altitude changes of less than ten centimeters.

By including similar components in the stylus 102, and sharing mobile device 112 orientation with the stylus via a radio frequency (RF) link 190 such as Bluetooth Low Energy, the stylus can determine (122) a writing angle γ (gamma) 108 corresponding to its own orientation relative to the electronic writing surface 114 when the stylus is engaged with the surface. The writing angle γ 108 approximately corresponds to a difference between an angle α (alpha) and an angle β (beta), where the angle α (alpha) is a measure of the difference in orientation between the longitudinal "Z" axis of the stylus and the direction of gravity, and the angle β (beta) is a measure of the difference in orientation of a "Z" axis of the writing surface 114 (which is orthogonal to a plane of the writing surface 114) and the direction of gravity. The "down" directions in FIG. 1 correspond to the constant acceleration due to gravity independently as determined by each of the stylus 102 and the mobile device 112 based on data from their respective accelerometers.

When the stylus is not engaged with the writing surface (e.g., based on a "tap" sensitive pressure sensor in the tip and/or feedback from the mobile device 112) and the orientation of the stylus is not proximate to the writing angle γ (gamma) 108, the stylus deactivates the tip emitter, turning the tip signal 106 "off" (124). When the stylus is not engaged with the writing surface and the orientation of the stylus is proximate to the writing angle γ (gamma) 108, the stylus reactivates the tip emitter, turning the tip signal 106 "on" (126). The stylus may use a weighted hysteresis to delay turning the stylus on-and-off based on a pattern of use, with the "on" delay ranging from none to a delay that is provided to determine that the orientation is relatively stable (e.g., to determine that the user is not twirling the stylus), and a longer "off" delay to avoid turning off the tip signal each time the stylus shifts in a user's hand.

Figure 2:
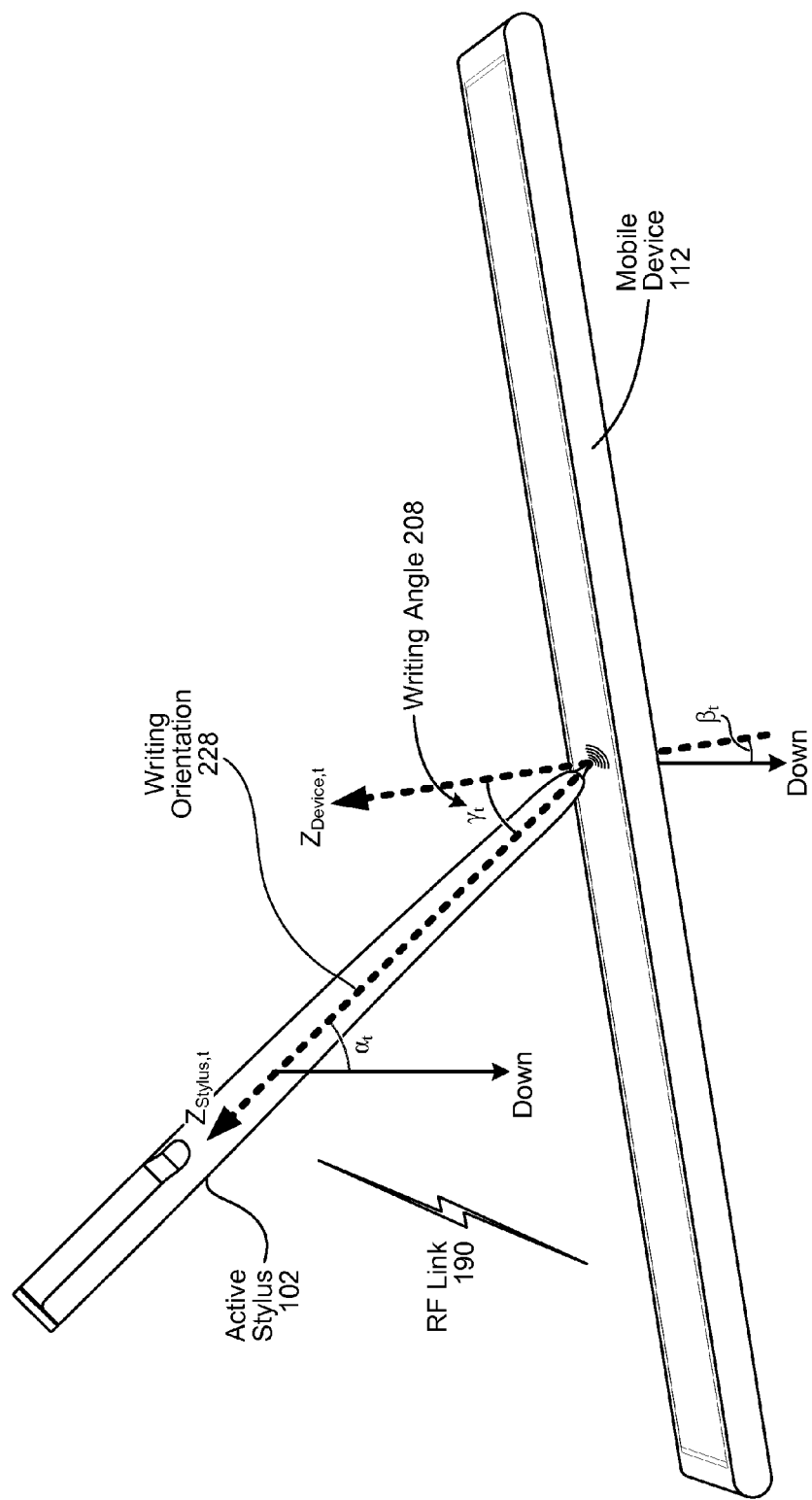
FIGS. 2-4 illustrate the stylus at various orientations relative to a mobile device.

FIG. 2 illustrates the stylus 102 engaged with the writing surface 114 at time "t." Using a three-axis accelerometer of the stylus 102, the stylus determines a vector which approximates the "down" direction in an Earth reference frame based on acceleration due to gravity. The difference between the down direction and the "Z" axis of the stylus corresponds to an angle $α_t$. Likewise, the mobile device 112 determines a down-direction vector using its own three-axis accelerometer, and transmits its direction-of-gravity "down" vector to the stylus via the RF link 190. The difference between the down direction and a "Z" axis orthogonal to the writing surface 114 corresponds to an angle $β_t$. The difference between the angle $α_t$ and the angle $β_t$ equals the writing angle $γ_t$ 208, which corresponds to a writing orientation 228 of the stylus relative to the writing surface.

Figure 3:
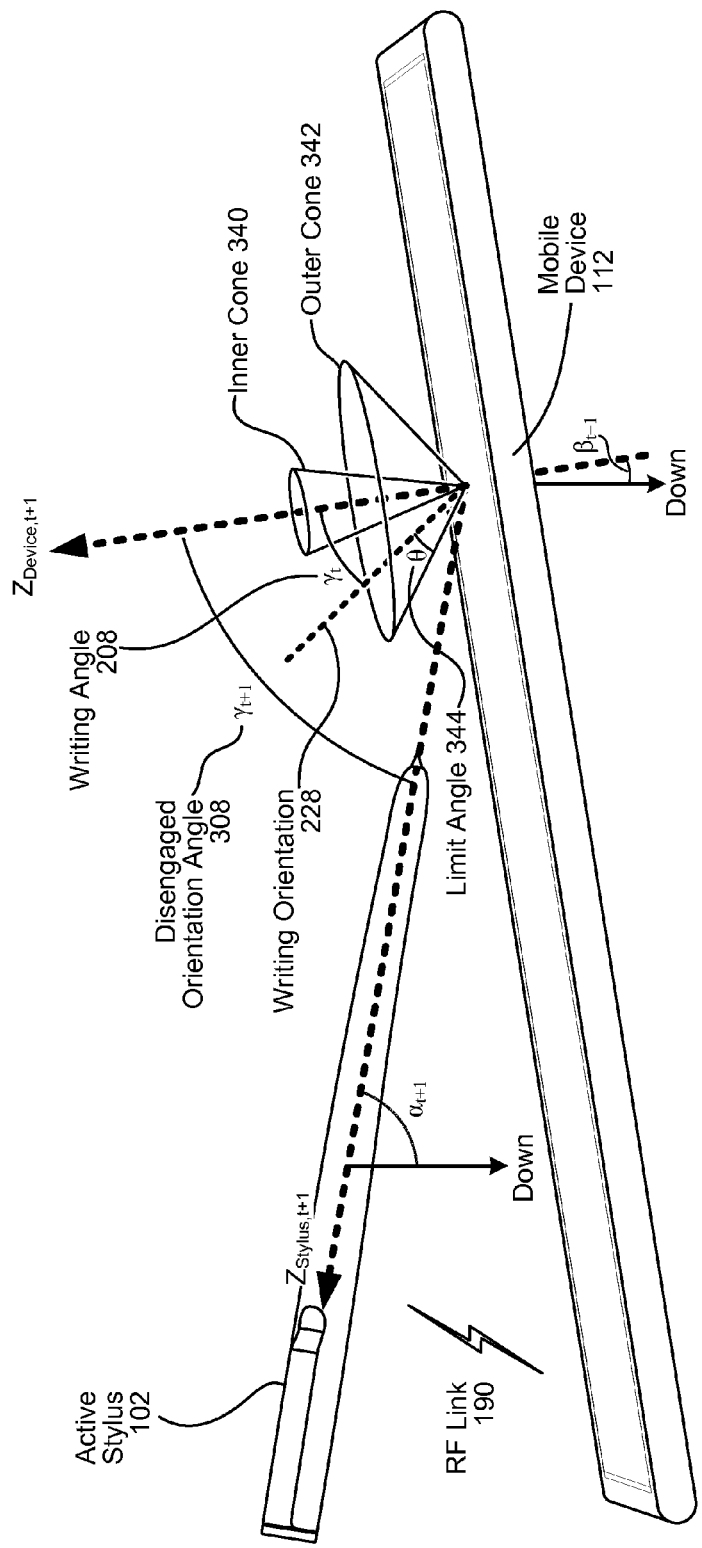

FIG. 3 illustrates the stylus 102 at time "t+1" when it is no longer engaged with the writing surface 114, and the hysteresis timer has expired, deactivating the tip emitter to turn the tip signal 106 "off." Based on the writing orientation 228 and writing angle $γ_t$ 208 determined at time "t," the stylus creates an inner proximity cone 340 and an outer proximity cone 342 corresponding to the writing angle $γ_t$ 208 plus-and-minus a limit angle θ (theta) 344, relative to the Z axis of the writing surface. As the "disengaged" orientation angle $γ_{t+1}$ (308) at time "t+1" falls outside of the range of orientations between the inner proximity cone 340 and the outer proximity cone 342, the tip signal 106 remains off.

Figure 4:
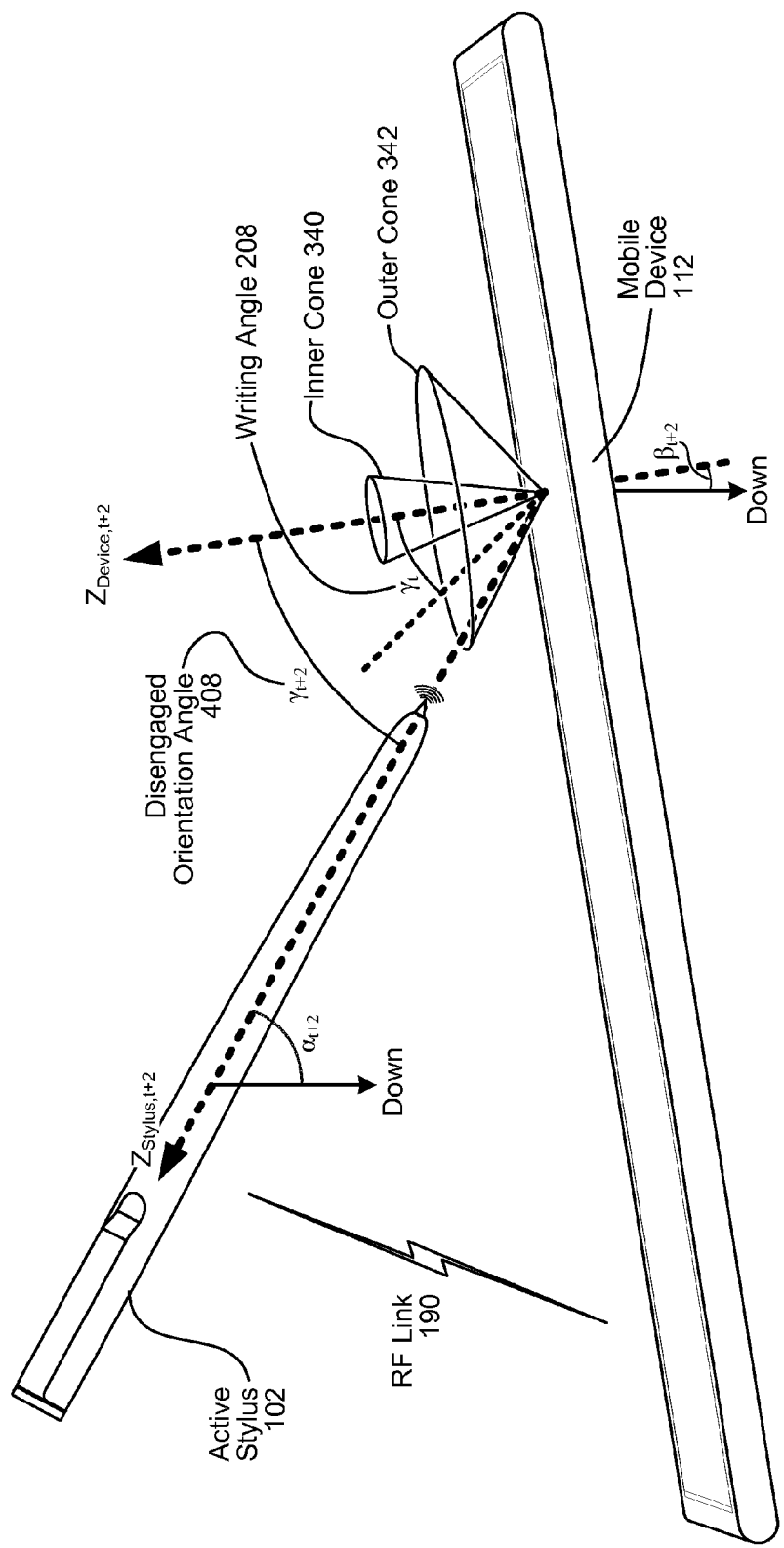

FIG. 4 illustrates the stylus 102 at time "t+2" when it is no longer engaged with the writing surface 114. Time t+2 occurs after the hysteresis timer has expired, deactivating the tip emitter to turn the tip signal 106 "off." As the disengaged orientation angle $γ_{t+2}$ (408) at time "t+2" falls between the inner proximity cone 340 and the outer proximity cone 342, the tip emitter is reactivated, turning the signal 106 back on. As mentioned above, the stylus may provide a short delay after the orientation angle is determined to fall inside the proximity cones as verification that the orientation is stable.

Figure 5:
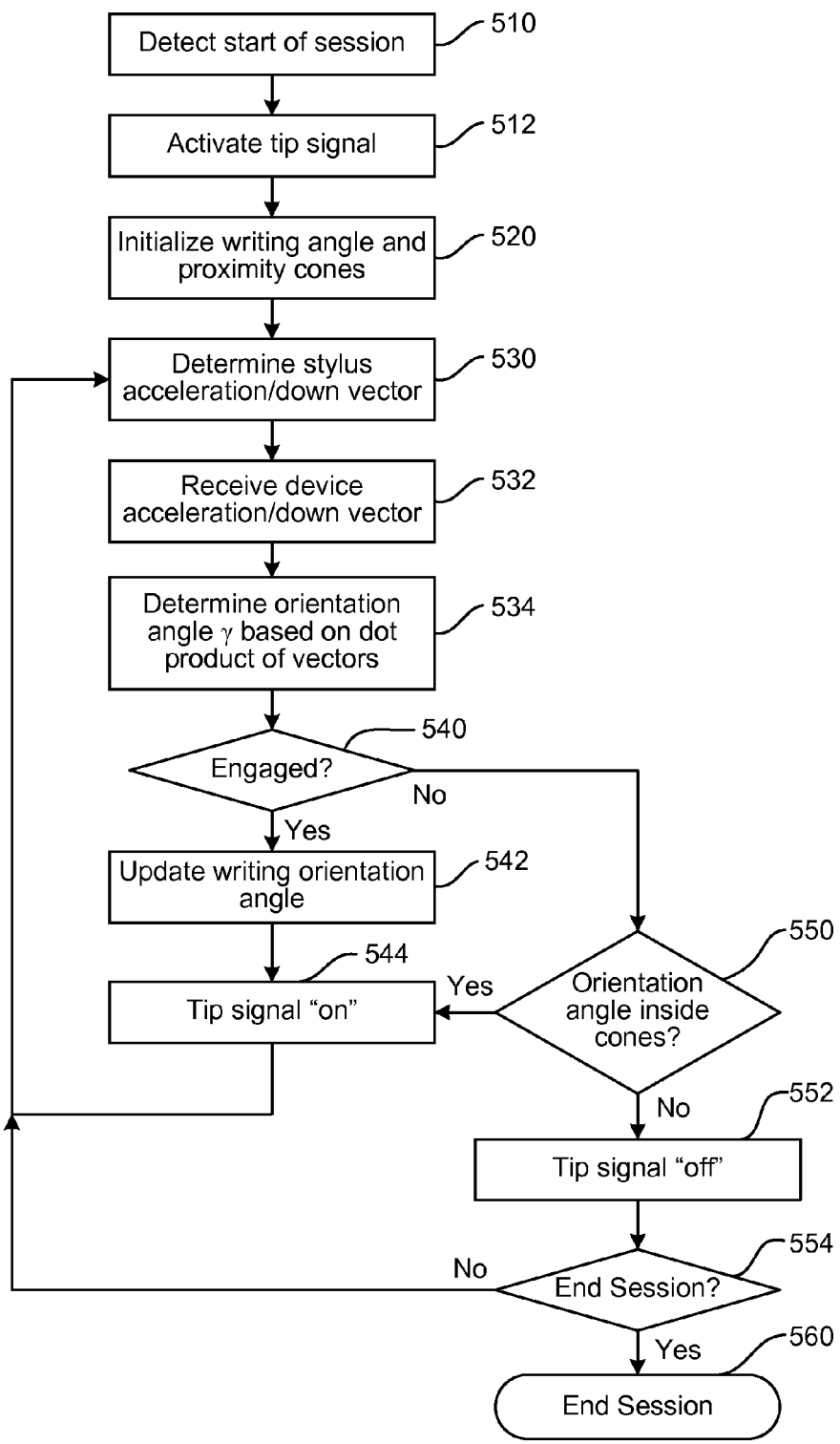
FIG. 5 illustrates a method for controlling the signal emitted by the stylus tip based on an orientation of the stylus relative to a writing surface.

FIG. 5 illustrates a process flow performed by a processor on the stylus to implement the operations illustrated in FIGS. 2-4. Hysteresis timer operations are omitted for brevity, but may operate as discussed in connection with FIG. 1.

In the process flow in FIG. 5, a 3-axis accelerometer on the mobile device 112 (e.g., tablet/phone) indicates the plane of the device with respect to acceleration due to gravity. Similarly, a 3-axis accelerometer on the stylus indicates the angle of the stylus with respect to acceleration due to gravity. By comparing the two gravity vectors and computing a dot product between them, certain relative configurations can be interpreted as "the user does not intend to write with the stylus." For example, if a tablet computer is flat on a surface, and the stylus points upwards, the user may be resting the stylus on his/her chin, or keeping it pointed upwards in her hand, and is not immediately going to write. Hence, the stylus can maintain a low power mode, keeping its power-consuming tip turned off. This configuration may utilize a low power RF communication link 190 (e.g. low energy) between the stylus 102 and the mobile device 112 to compare the two direction-of-gravity vectors, but the power used by the communication link is typically significantly lower in power consumption than keeping the active tip emitter turned on.

A session begins when stylus activity is detected (510). Such activity includes a user's physical interaction with a barrel capacitive touch sensor (110), the user turning the stylus "on" via a switch, and/or a change in movement of the stylus detected by its IMU or barometer. On the assumption that a user is preparing to use the stylus to write, the tip signal is activated (512).

The writing angle $γ_t$ of the stylus 102 relative to the writing surface 112 and the cone limit angle θ used to define the inner and outer proximity cones are initialized 520. Various techniques may be used for initialization. The writing angle $γ_t$ and cone limit angle θ may be initialized based on the angles from the last session or based on angles stored on the device determined in accordance with previous user usage habits. The angles may be initialized based on a range of values determined heuristically by user study, where different angles may be selected depending upon (among other things) the default language associated mobile device 112 (since different writing styles associated with different languages may have different optimal values for the writing angle $γ_t$ and cone limit angle θ). The writing angle $γ_t$ and the cone limit angle θ may be initialized by determining a minimum writing angle and a maximum writing angle as the user begins writing, with the cone limit angle θ based on a default value and/or the range between minimum and maximum. The writing angle $γ_t$ may be set as the user begins writing (e.g., based on actuation of a tip "tap" sensor), employing a default cone limit angle θ, and refining and calibrating these angles as the user writes. These techniques are readily combinable, such as starting with initial values and then refining and calibrating the angle values based on data accumulated as the tip 104 touches down on the writing surface 114. As writing angles can vary during a session (e.g., based on the tip's proximity to the edge of the writing surface) and based on time of day (e.g., based on the user's degree of tiredness), refining the angles during a session can improve device efficiency and performance.

Polling data from the accelerometer, data relating to determined minimum angles/orientations, and data relating to determined maximum angles/orientations may be stored by the stylus and kept after the session ends. This data may be used to initialize and/or calibrate the stylus, and to determine a user's characteristic writing behavior.

The stylus 102 determines (530) an approximate down vector based on the force of gravity on the accelerometer. Measured raw data from the three-axes accelerometer can be represented as:

$$s_{a,stylus} = [a_{x,stylus}\ a_{y,stylus}\ a_{z,stylus}] \quad [1]$$

where the acceleration values correspond to acceleration of the stylus along the Cartesian x, y, and z axes of the stylus' IMU.

The stylus receives (532) an direction-of-gravity vector from the mobile device 112 via the RF link 190. The acceleration from the mobile device may be expressed as:

$$s_{a,device} = [a_{x,device}\ a_{y,device}\ a_{z,device}] \quad [2]$$

where the acceleration values correspond to acceleration of the device along Cartesian x, y, and z axes of the device's IMU.

The orientation angle γ of the stylus 102 relative to the writing surface 114 is determined (534) based on a dot product of the direction-of-gravity vectors. Specifically:

$$s_{a,stylus} \cdot s_{a,device} = \|s_{a,stylus}\|\|s_{a,device}\| \cos(\gamma) \quad [3]$$

where $\|s_a\|$ is the norm (i.e., magnitude) of the measured raw accelerometer data.

Based on equation [3], the orientation angle γ equals:

$$\gamma = \cos^{-1}\left(\frac{s_{a,stylus} \cdot s_{a,device}}{\|s_{a,stylus}\|\|s_{a,device}\|}\right) \quad [4]$$

If the tip 104 is engaged with the writing surface 114 (540 "Yes"), the writing angle 208 may be updated (542) and the tip signal turned "on" (544) or left on if already on. For example, if the stylus 102 is basing the writing angle γ (208) and/or the cone limit angle θ (344) on measured minimum and maximum orientation angles, the determined orientation angle may be compared with the minimum and maximum orientation angles. If the current orientation angle is less than the existing minimum orientation angle, the current orientation angle becomes the new minimum. Likewise, if the current orientation angle is greater than the existing maximum orientation angle, the current orientation angle becomes the new maximum. Based on the change to the minimum or maximum, the writing angle γ (208) and/or the cone limit angle θ (344) may be updated (542).

If the tip 106 is not engaged with the writing surface 114 (540 "No"; e.g., based on a time since the last actuation of the tip pressure sensor exceeding a time limit and/or feedback from the mobile device 112) and the orientation angle 308 falling outside the proximity cones 340/342 as illustrated in FIG. 3 (550 "No"), the tip emitter is deactivated, turning the tip signal 106 off (552), or kept off if already off. A determination (554) may be made whether to end the session (560), suspending operations such as the RF Link 190, based on (among other things), the amount of time since the stylus was last engaged with the writing surface and whether the stylus' barrel touch sensor 110 indicates that the stylus is being held by a user. Otherwise, if the orientation angle is inside the cones (550 "Yes") as illustrated in FIG. 4, the tip signal is turned on (544) or left on if already on.

Figure 6A:
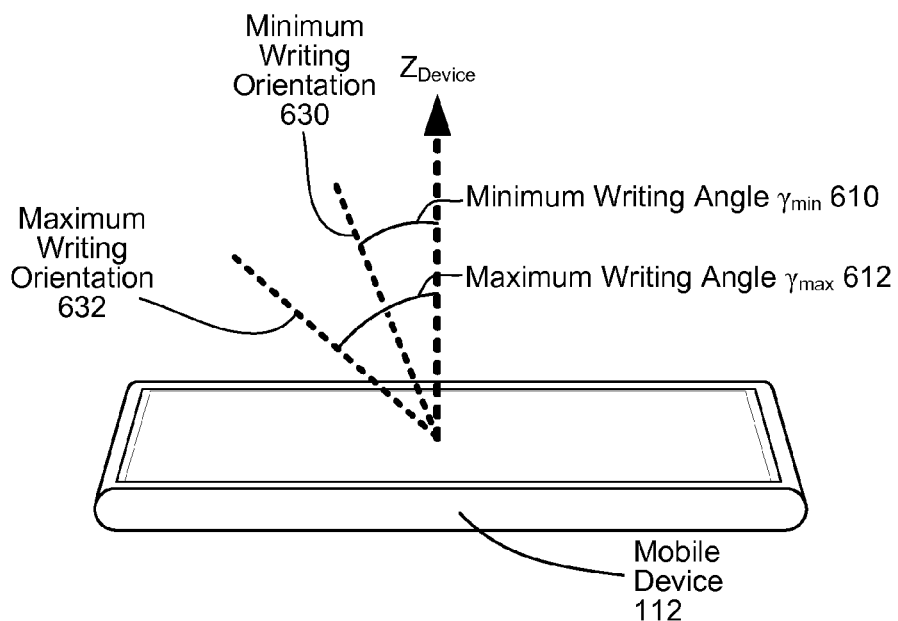
FIGS. 6A and 6B illustrate a method for determining an average writing orientation of the stylus.
Figure 6B:
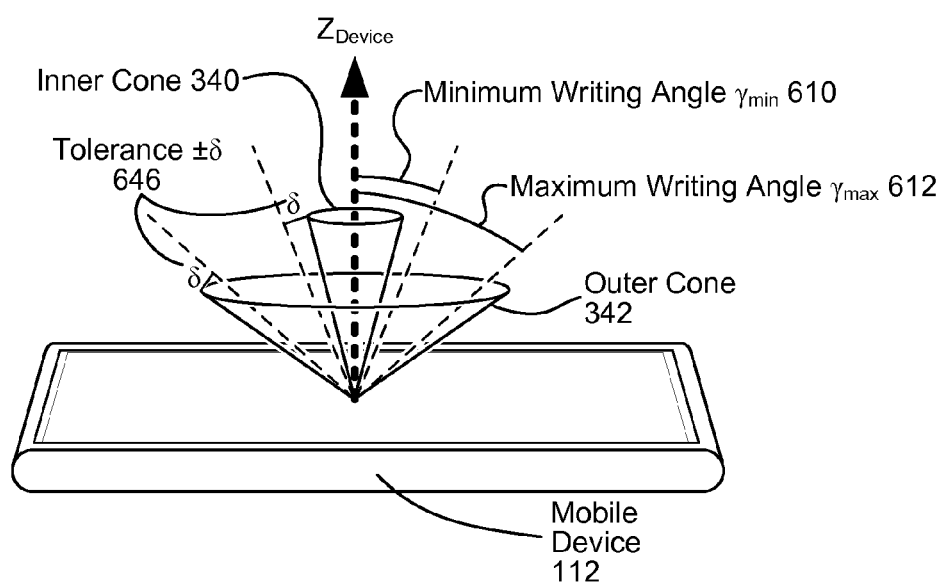

FIGS. 6A and 6B illustrate an example of how the writing angle γ (208) and/or the cone limit angle θ (344) may be determined based on the minimum and maximum measured orientation angles over multiple samples taken during a session. Based on a minimum measured writing angle 610 corresponding to a minimum writing orientation 630 of the stylus relative to the writing surface 114 and a maximum measured writing angle 612 corresponding to a maximum writing orientation 632, an average orientation can be determined as an average measured writing angle $\gamma_{avg}$:

$$\gamma_{avg} = (\gamma_{max} + \gamma_{min})/2 \quad [5]$$

which may be used as the writing angle 208, where writing angle 208 is used to determine whether to turn the tip signal on or off The cone limit angle θ (344) may also be determined based on the minimum and maximum measured angles:

$$\theta = \frac{\gamma_{max} - \gamma_{min}}{2} + \delta \quad [6]$$

where "δ" is a constant angle value added as a tolerance value to broaden the angular range of the inner proximity cone 340 and outer proximity cone 342, such as setting "δ" equal to ten degrees. As noted above, the writing angle and cone limit may be periodically updated (542), such as when the minimum angle 610 is decreased, or the maximum angle 612 is increased. If the minimum writing angle $\gamma_{min}$ 610 minus the tolerance value δ results in a negative angle, the inner cone 340 collapses, effectively leaving the outer cone 342 as the deciding factor for tip emitter control. If the maximum writing angle $\gamma_{max}$ 612 plus the tolerance value δ results in an angle exceeding ninety degrees, the outer cone limit may be set to plus/minus ninety degrees (relative to the device Z axis), effectively leaving the inner cone 340 and the plane of the writing surface 114 as the deciding factor for tip emitter control.

The system 100 may also operate without a communication link between the stylus 102 and the mobile device 112. With the communication link 190, the writing angle may be determined relative to the writing surface 114. An advantage of such a relative orientation is if a user is holding the mobile device 112 and the orientation of the mobile device 112 changes relative to an Earth reference frame (altering $s_{a,stylus}$), it does not necessarily impact the measured angle γ (gamma) of the stylus relative to writing surface 114.

Figure 7:
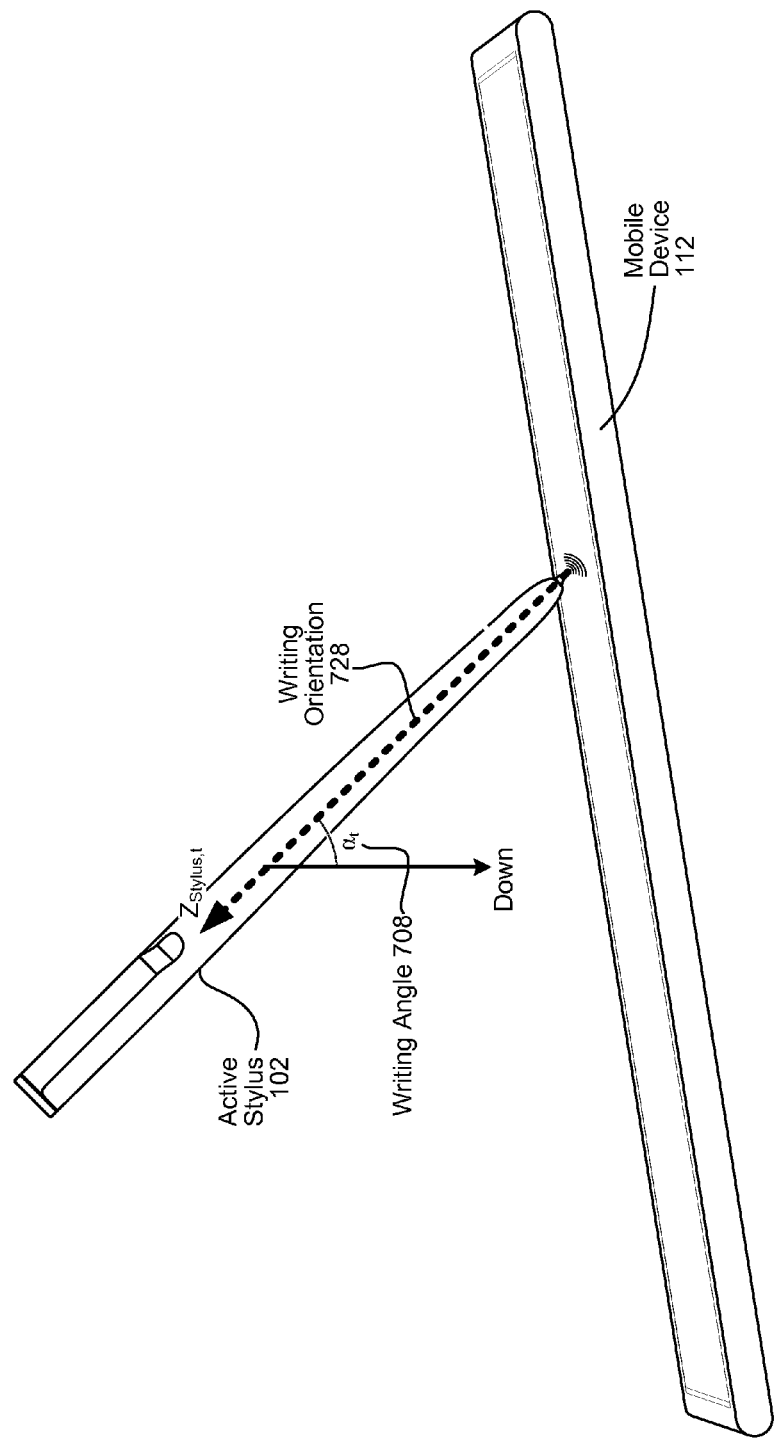
FIGS. 7 and 8 illustrate a stylus at various orientations.

As illustrated in FIG. 7, without the communication link, the stylus 102 may determine a writing orientation 728 relative to an Earth reference frame, where the writing angle $\alpha_t$ 708 is relative to the "down" direction as measured by the stylus' accelerometer. The stylus then performs a self-comparison between the current direction-of-gravity vector of the stylus and a vector based on the writing orientation 728. The writing orientation 728 may be determined, among other ways, based on the last orientation when the stylus was engaged with the writing surface 114 (e.g., based on a tip pressure sensor), may be determined based on a minimum and maximum angles (e.g., as discussed with FIGS. 6A and 6B, replacing angles γ (gamma) relative to the writing surface 114 with the angles α (alpha) relative to the Earth reference frame), etc.

Figure 8:
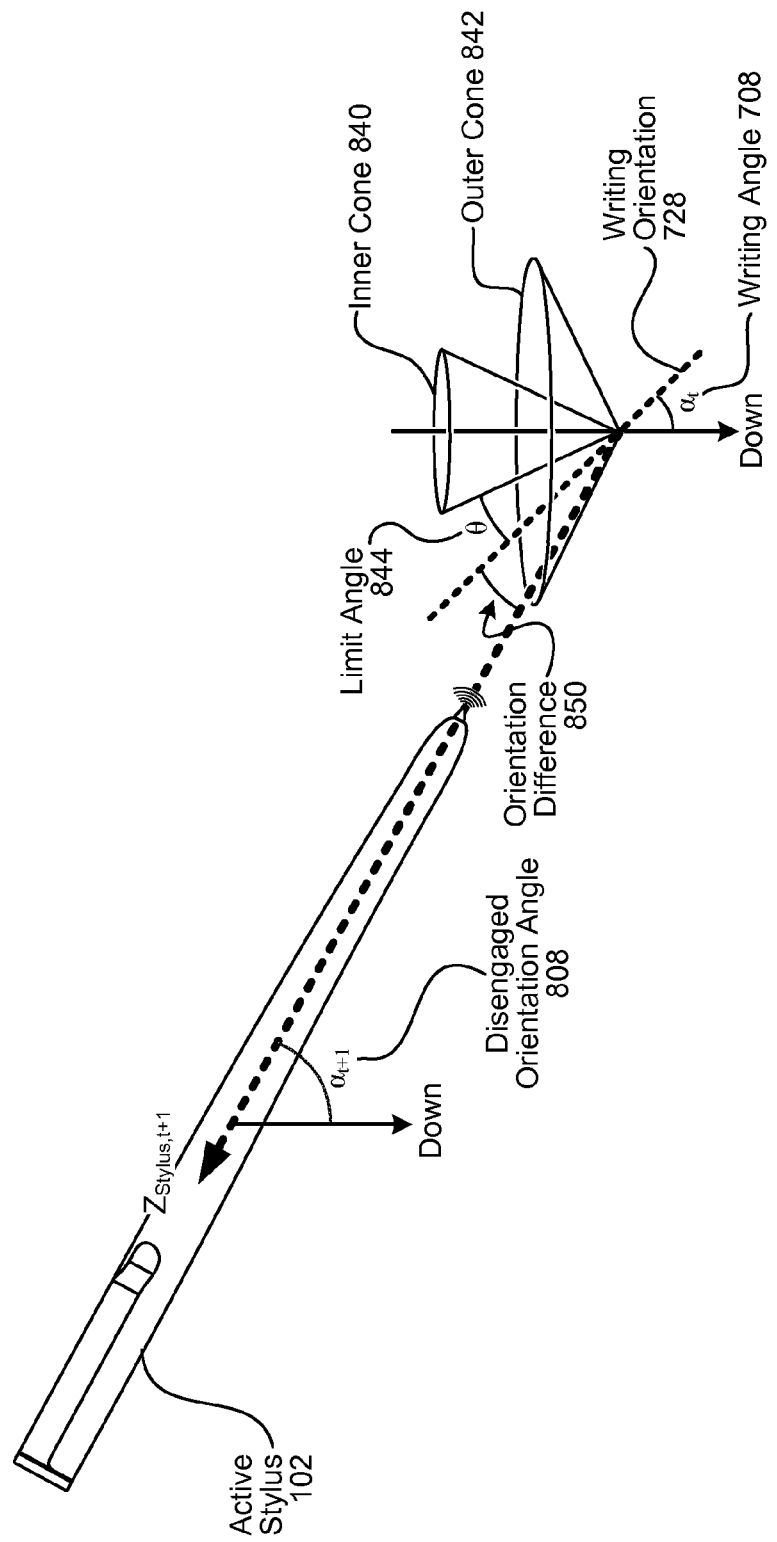

FIG. 8 illustrates how an inner proximity cone 840 and an outer proximity cone 842 may be based on the stylus' own self-comparison data, determining an orientation difference 850 based on comparison of an orientation angle 808 when the stylus is not engaged with the writing surface with the determined writing angle 708 plus-and-minus the limit angle θ 844.

Figure 9:
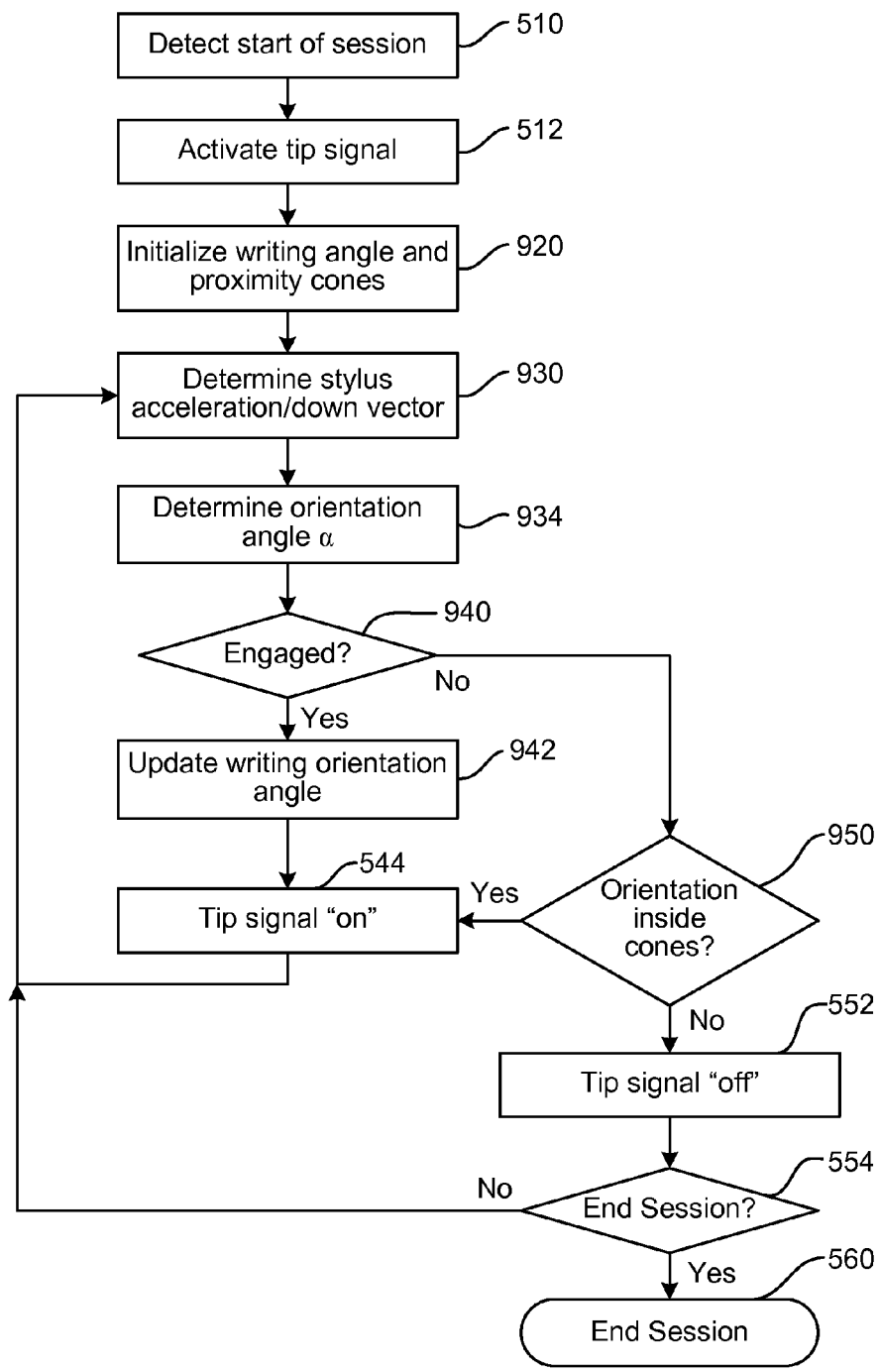
FIG. 9 illustrates a method for controlling the signal emitted by the stylus tip based on changes in orientation of the stylus.

FIG. 9 is similar to FIG. 5 and illustrates a process flow performed by a processor on the stylus to implement the operations illustrated in FIGS. 7 and 8. Hysteresis timer operations are omitted for brevity, but may operate as discussed in connection with FIG. 1.

In the process flow in FIG. 9, a 3-axis accelerometer of the stylus 102 may be used to determine the angle α of the stylus with respect to gravity. Determining a gravity vector in the sensor frame of the stylus captures an orientation of the longitudinal "z" axis of the stylus relative to "down" (e.g., corresponding to the writing orientation 728).

A session begins when stylus activity is detected (510). Such activity includes a user's physical interaction with a barrel capacitive touch sensor (110), the user turning the stylus "on" via a switch, and/or a change in movement of the stylus detected by its IMU or barometer. On the assumption that a user is preparing to use the stylus to write, the tip signal is activated (512).

The writing orientation relative to an angle α of the stylus 102 (angle $\alpha_t$ being based on a difference between a longitudinal "Z" axis of the stylus when writing and the down direction) and the cone limit angle θ are initialized 920. Various techniques may be used for initialization. The writing angle $\alpha_t$ may be initialized as the initial angle when the tip engages the writing surface (e.g., based on actuation of a tip pressure sensor). The cone limit angle θ may be based on the limit from the last session, may be initialized based on past usage patterns, may be initialized based on a range of values determined heuristically by user study, and/or may be a constant. The writing angle $\alpha_t$ and the cone limit angle θ may be updated based on a minimum writing angle and maximum writing angle as the user begins writing. As writing angles can vary during a session (e.g., based on the tip's proximity to the edge of the writing surface) and based on time of day (e.g., based on the user's degree of tiredness), refining the angles during a session can improve device efficiency and performance.

The stylus 102 determines (930) an approximate down vector based on the force of gravity indicated in the accelerometer data $s_{a,stylus}$ as represented above in equation [1]. The angle α may be determined (934) by taking the dot product of the acceleration data with a vector corresponding to the longitudinal axis (Z axis) of the stylus. Specifically:

$$s_{a,t} \cdot [0\ 0\ -1] = \|s_{a,t}\| \|[0\ 0\ -1]\| \cos(\alpha) \quad [7]$$

where $\|s_a\|$ is the norm (i.e., magnitude) of the measured raw accelerometer data. Thus, the angle α equals:

$$\alpha = \cos^{-1}\left(\frac{s_{a,t} \cdot [0\ 0\ -1]}{\|s_{a,t}\| \|[0\ 0\ -1]\|}\right) \quad [8]$$

Referring to FIG. 8, the orientation difference 850 between the writing angle $\alpha_t$ (708) and the current angle $\alpha_{t+1}$ (808) is determined by comparing the angles determined at each of the times using equation [8].

If the tip 104 is engaged with the writing surface 114 (940 "Yes"), the stored vector based on the writing orientation 728 may be updated (942) and the tip emitter turned on (544) or kept on. For example, the current stylus angle α may replace the writing angle, and/or the minimum or maximum angle may be updated (referring back to FIGS. 6A and 6B).

If the tip 104 is not engaged with the writing surface 114 (940 "No"; e.g., based on a time since the last actuation of the pressure sensor in the tip exceeding a time limit), a determination (950) is made as to whether the current angle of the stylus falls between the inner proximity cone 840 and the outer proximity cone 842. Based on the writing angle $\alpha_t$ and the orientation angle $\alpha_{t+1}$ determined using equation [8], the difference 850 between the writing angle 708 and the current orientation angle $\alpha_{t+1}$ 808 may be determined. If the absolute value of the difference 850 is less than the limit angle θ, then the orientation angle 808 falls within the inner cone 840 and the outer cone 842. If the absolute value of the difference 850 is greater than the limit angle θ, then the orientation angle 808 falls outside the inner cone 840 and the outer cone 842. In the alternative, the orientation angle 808 may be compared to angles corresponding to those of the inner cone 840 and outer cone 842.

If the orientation angle 808 is outside the cones (950 "No"), the tip signal is turned off (552), or kept off if already off. A determination (554) may be made whether to end the session (560) based on (among other things) the amount of time since the stylus was last engaged with the writing surface and whether the stylus' barrel touch sensor 110 indicates that the stylus is being held by a user. Otherwise, if the orientation is inside the cones (950 "Yes") as illustrated in FIG. 8, the tip signal is turned on (544) or left on if already on.

This self-comparison approach between the current gravity-based down vector of the stylus and the "last recorded" gravity-based down vector when the stylus was touching/writing on the mobile device 112 is particularly well-suited to situations where the mobile device 112 is stationary, such as when it is lying on a flat surface, such that the mobile device's specific plane orientation remains constant. If a measured orientation difference 850 falls outside of the proximity cones 840/842 but the stylus engages the writing surface, which may indicate that the plane of the writing surface has changed orientations, then the writing orientation may be reset based on the current orientation. In addition, the stylus may activate the RF link 190 and switch to the mode of operation discussed in connection with FIG. 5 on the assumption that the mobile device 112 is no longer stationary.

As an alternative to the three-axis solution discussed in connection with FIG. 9, the angle α may be determined using accelerometer data for only the Z axis of the stylus. In this case, the process is the same as discussed in connection with FIGS. 7, 8, and 9, but equations 7 and 8 are replaced with equations 9 and 10 as follows:

$$\frac{a_{z,stylus}}{g} = \cos(\alpha) \quad [9]$$

$$\alpha = \cos^{-1}\left(\frac{a_{z,stylus}}{g}\right) \quad [10]$$

where g is acceleration due to gravity (i.e., 9.8 meters per second per second). This single axis approach benefits from calibrating the z-axis accelerometer so that when the longitudinal axis of the stylus is vertical (tip down), $a_{z,stylus}$ equals g.

Barometric pressure may also be used to turn the tip signal 106 on and off. Using a sensitive barometer on the stylus 102 and comparing its reading to a sensitive barometer on the mobile device 112 provides an approximation of whether the stylus may be proximate to the writing surface. The barometric pressures correspond to a relative vertical height. A stylus being much higher and lower than the tablet (e.g., resting on a user's chin) would indicate lack of intent to write even if the stylus is in the user's hand.

Figure 10:
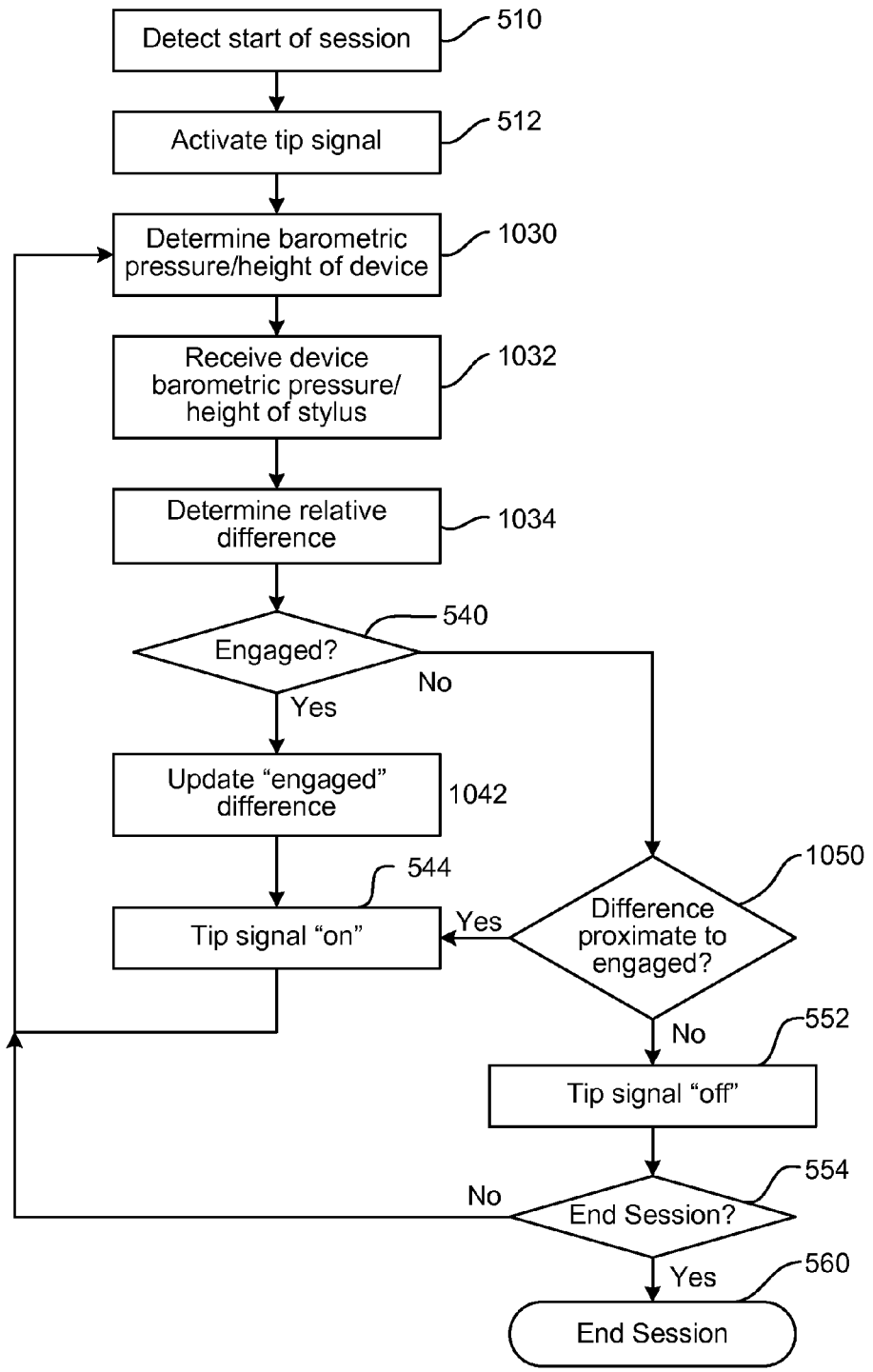
FIG. 10 illustrates a method for controlling the signal emitted by the stylus tip based on differences in between barometer data from the stylus and barometer data from the mobile device.

FIG. 10 illustrates a process flow performed by a processor on the stylus to implement the operations using barometric pressure. A session begins when stylus activity is detected (510). Such activity includes a user's physical interaction with a barrel capacitive touch sensor (110), the user turning the stylus "on" via a switch, and/or a change in movement of the stylus detected by its IMU or barometer. On the assumption that a user is preparing to use the stylus to write, the tip signal is activated (512).

The barometric pressure and/or height (e.g., altitude relative to sea level) of the stylus is determined (1030) based on barometer data. The stylus receives (1032) a barometric pressure and/or a height from the mobile device 112 via the RF link 190. Even at the same actual height, the barometers of the stylus and mobile device may provide different data due to, among other things, differences in calibration. To reduce the impact of such variability in data, the stylus determines (1034) a relative difference between its barometer data and that received from the mobile device.

If the tip 104 is engaged with the writing surface 114 (540 "Yes"), the relative difference in the barometer data is set (1042) as the difference associated with when the stylus is "engaged" and the tip emitter is turned on (544) if not already on. If the tip 104 is not engaged with the writing surface 114 (540 "No"; e.g., based on a time since the last actuation of the pressure sensor in the tip exceeding a time limit and/or feedback from the mobile device 112) and the current difference does not fall within a range of the "engaged" difference plus-and-minus a stored threshold value (1050 "No"), the tip emitter is deactivated, turning the tip signal 106 off (552), or kept off if already off. A determination (554) may be made whether to end the session (560), suspending operations such as the RF Link, based on (among other things), the amount of time since the stylus was last engaged with the writing surface and whether the stylus' barrel touch sensor 110 indicates that the stylus is being held by a user. Otherwise, if the current difference in barometer data falls within a range of the "engaged" difference plus-and-minus the stored threshold value (1050 "Yes"), the tip signal is turned on (544) or left on if already on.

As another approach similar to that in FIG. 10, but using a single barometer on the stylus, a current pressure/height measured by the stylus and is compared to an "engaged" pressure/height reading that was the 'last recorded' barometer reading when the stylus was touching the mobile device 112. A significant difference in barometer data likely indicates the stylus tip can be turned off until the difference reduces again.

Figure 11:
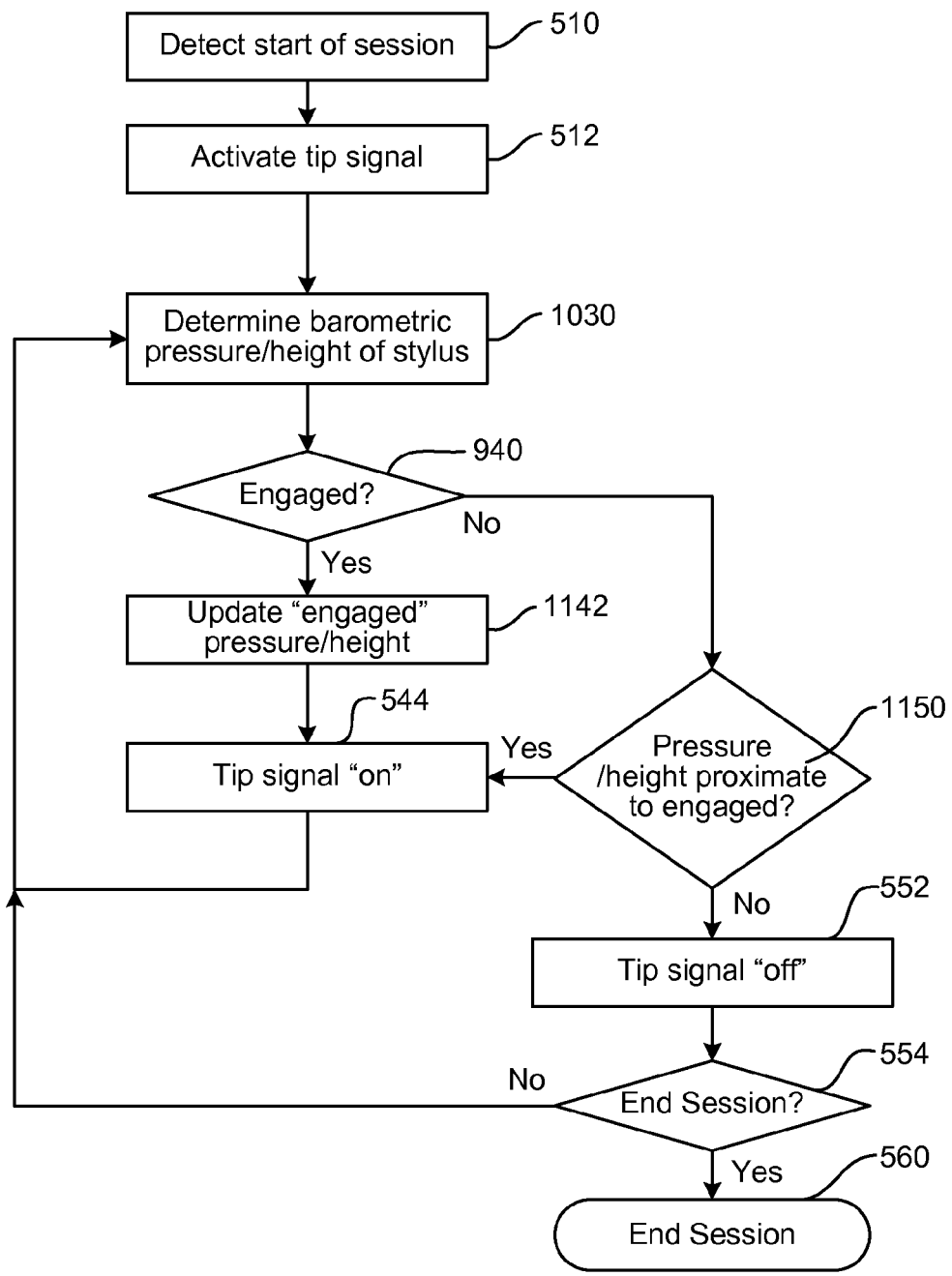
FIG. 11 illustrates a method for controlling the signal emitted by the stylus tip based on changes in barometer data of the stylus.

FIG. 11 illustrates a process flow performed by a processor on the stylus to implement barometer based tip control without barometer data from the mobile device 112. A session begins when stylus activity is detected (510). Such activity includes a user's physical interaction with a barrel capacitive touch sensor (110), the user turning the stylus "on" via a switch, and/or a change in movement of the stylus detected by its IMU or barometer. On the assumption that a user is preparing to use the stylus to write, the tip signal is activated (512).

The barometric pressure and/or stylus height (e.g., altitude relative to sea level) is determined 1030 based on barometer data. If the tip 104 is engaged with the writing surface 114 (940 "Yes"), the barometer data is stored (1142) as the "engaged" pressure and/or height and the tip is turned on (544) if not already on. If the tip 106 is not engaged with the writing surface 114 (940 "No"; e.g., based on a time since the last actuation of the pressure sensor in the tip exceeding a time limit and/or feedback from the mobile device 112) and the current barometer data does not fall within a range of the "engaged" data plus-and-minus a stored threshold value (1150 "No"), the tip emitter is deactivated, turning the tip signal 106 off (552), or kept off if already off. A determination (554) may be made whether to end the session (560) based on (among other things), the amount of time since the stylus was last engaged with the writing surface and whether the stylus' barrel touch sensor 110 indicates that the stylus is being held by a user. Otherwise, if the current barometer data falls within the range of the "engaged" data plus-or-minus a stored threshold value (1150 "Yes"), the tip signal is turned on (544) or left on if already on.

The accelerometer-based processes illustrated in FIG. 5 and FIG. 9 may be executed in parallel or in series with the barometer-based processes illustrated in FIG. 10 and FIG. 11. For example, deactivation of the tip emitter may be a parallel operation, where the tip is turned off (552) if the orientation angle of the stylus is outside the cones (340/342/840/842) or the pressure/altitude data suggests that the stylus is not close (1050/1150 "No") to the writing surface. As another example, reactivation of the tip emitter may be a series operation, where the tip is turned on (544) if the orientation angle of the stylus is between the cones (340/342/840/842) and the pressure/altitude data suggests that the stylus is close (1050/1150 "Yes") to the writing surface. Other combinations are possible, such as deactivation of the tip as a series operation (i.e., turn off tip if angle outside the cones and barometric-based distance exceeding threshold), and reactivation of the tip as a parallel operation (i.e., turning tip on if angle between the cones and barometric-based distance within threshold). Series-series and parallel-parallel may also be used. Which combinations are used may depend upon, among other things, balancing factors such as the importance of preserving battery power (favoring turning off the tip based on parallel criteria and turning on the tip based on series criteria) the and responsiveness of the stylus (favoring turning off the tip based on series criteria and turning on the tip based on parallel criteria).

These processes are easily combined by adding a series "and" and a parallel "or" criteria to combine the on/off decisions (550/950/1050/1150). For example, to "and" the criteria for turning the tip "off" in FIGS. 5 and 10, both decision 550 and decision 1050 must result in a "no" to turn the tip off How these processes are combined may also be adjusted by the processor in the stylus adaptively based on simple rules and/or heuristics using stylus status and performance information, such as available stylus battery life remaining (e.g., to favor turning off the tip emitter based on a parallel criteria if the battery is low), or to reduce when the tip is turned off based on detecting the tip engaging (540/940 "Yes") with the writing surface before the emitter is turned on (e.g., to favor turning off the tip based on a series criteria and turning on the tip based on a parallel criteria).

Figure 12:
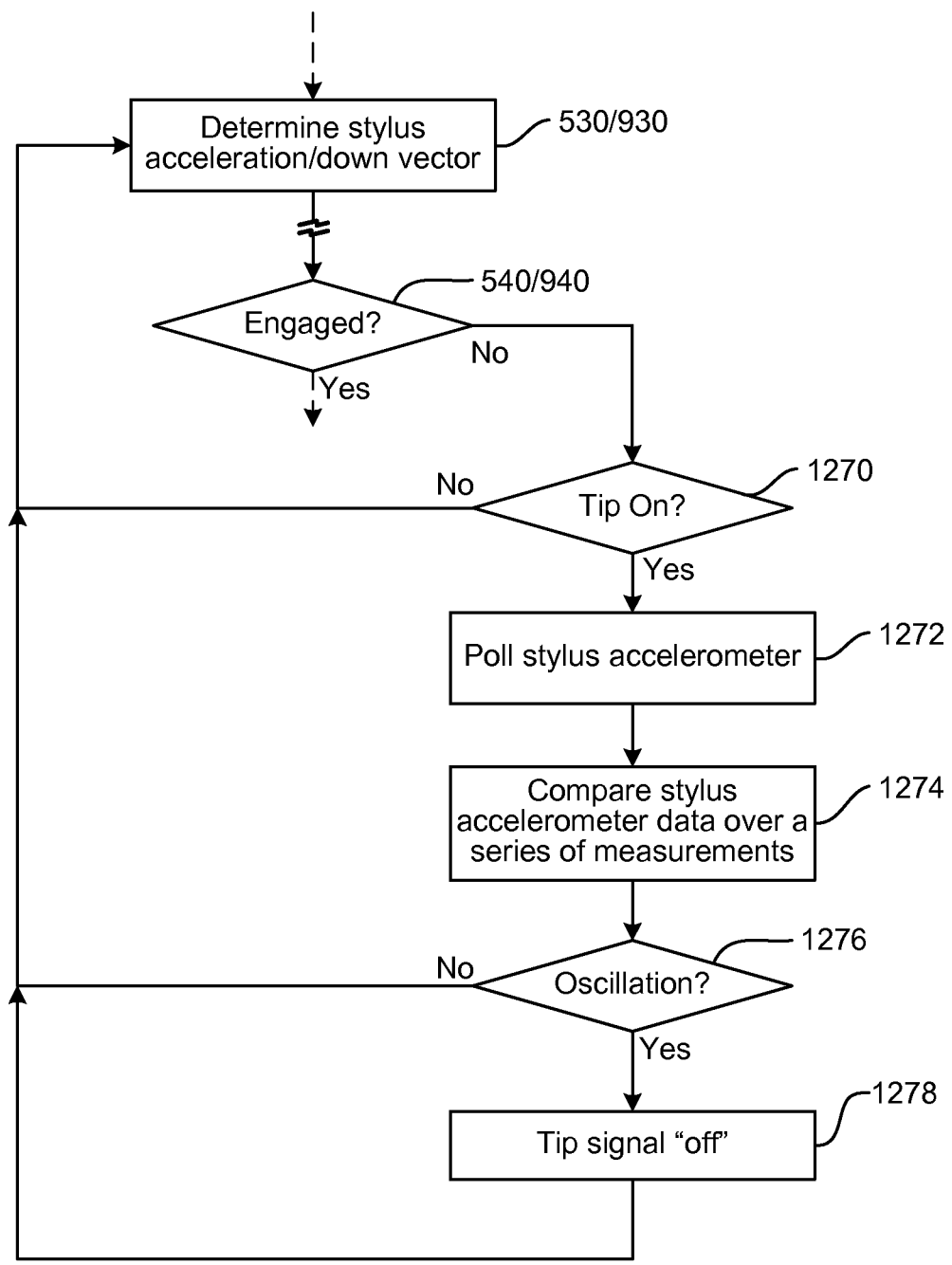
FIG. 12 illustrates a method for controlling the signal emitted by the stylus tip based on whether the stylus is being moved in a manner inconsistent with operating the device.

FIG. 12 illustrates another tip signal control mechanism that may be executed by the stylus' processor in parallel with the processes in FIGS. 5, 9, 10, and 11. The single Z axis or three-axis accelerometer data of the stylus can be used to detect spinning and twiddling the 'pen' about the longitudinal "Z" axis, which typically indicates lack of intent to write/take notes. This may be checked when the stylus is not engaged with the writing surface (540/940 "No") but the tip emitter is turned on (1270 "Yes"). While checking for spinning/twiddling, if the stylus tip engages with the writing surface (540/940 "Yes") at any time, the process in FIG. 12 resets (not shown).

To determine whether the user is spinning or twiddling the stylus, the accelerometer is polled (1272) to sample data over an interval of time. This may be at the ordinary polling rate used by the processes in FIGS. 5 and 9, or maybe different (e.g., at an increased rate) to provide a more-detailed motion sample. The readings are compared (1274) over a series of measurements to determine whether there is an oscillation or repetitive motion with substantial periodicity (1276) within a margin of error, indicating that the stylus is spinning. If there is an oscillation or such repetitive motion (1276 "Yes"), the tip signal is turned off (1278). When the tip is turned off (1278) due to spinning, hysteresis timer values may be adjusted/increased so that the tip is not reactivated based on angle (550/950 "Yes") and/or barometer data (1050/1150 "Yes") unless the data is stable for a specified amount of time or number of accelerometer/barometer samples.

The comparison 1274 of the accelerometer data may apply a fast Fourier transform (FFT) to the polled data to determine whether there is a substantial periodicity within a margin of error. As an alternative to an FFT, the minima and maxima extremes in the acceleration data over a series of polled data samples can be compared to determine a rate of change indicating an oscillation or at least substantial periodicity within a margin of error. A rate of change of oscillation/periodicity may be determined by applying a bandpass filter to a set accelerometer sampling rate. The accelerometer data may be recorded and compared, or passed directly to the filter. An example of a sampling rate to determine oscillation/periodicity may be, for example, three or four cycles per second. As another approach, based on a set duration such as a second or two, a determination may be made as to how many times a change in orientation has resulted in the tip emitter being turned on and off due to the accelerometer-based processes illustrated in FIGS. 5 and 9. As another alternative, a peak-valley detection algorithm may be applied to the polled data samples. In addition to the polled accelerometer data, or as an alternative, gyroscope data may be used to determine whether the stylus is spinning Another alternative is comparison of extremes in the acceleration data over a fixed sampling period. With each of these approached, a threshold number of consistent accelerometer samples may be required before activating or deactivating the tip emitter, such as requiring three consistent samples of accelerometer data.

Each of the techniques in FIGS. 5, 9, 10, 11, and 12 will have some false positives/false negatives. Fusing an orientation based approach (FIGS. 1, 5, 9), with a barometric data based approach (FIGS. 10 and 11), and with "twiddle" detection (FIG. 12) yields a more robust and high accuracy (low false positives and negatives) solution that maximizes battery life while also enabling a good user experience that turns the stylus on just in time to write/take notes.

Although the above examples have focused primarily on accelerometer data and barometer data, the IMU of each of the stylus 110 and the mobile device 112 may also include a magnetometer and a gyroscope. Relying on accelerometer and barometer data alone, no determination is made as to whether the stylus is pointed in a direction of the mobile device, such that the measured angles (angle γ and angle α) provide incomplete data. For example, the stylus may exhibit an orientation/angle within the proximity cones, even though it is pointed away from the writing surface 114 of the mobile device 112. The trade-off is that acquiring more complete data utilizes more power, reducing the overall efficacy of turning the tip signal off.

Figure 13:
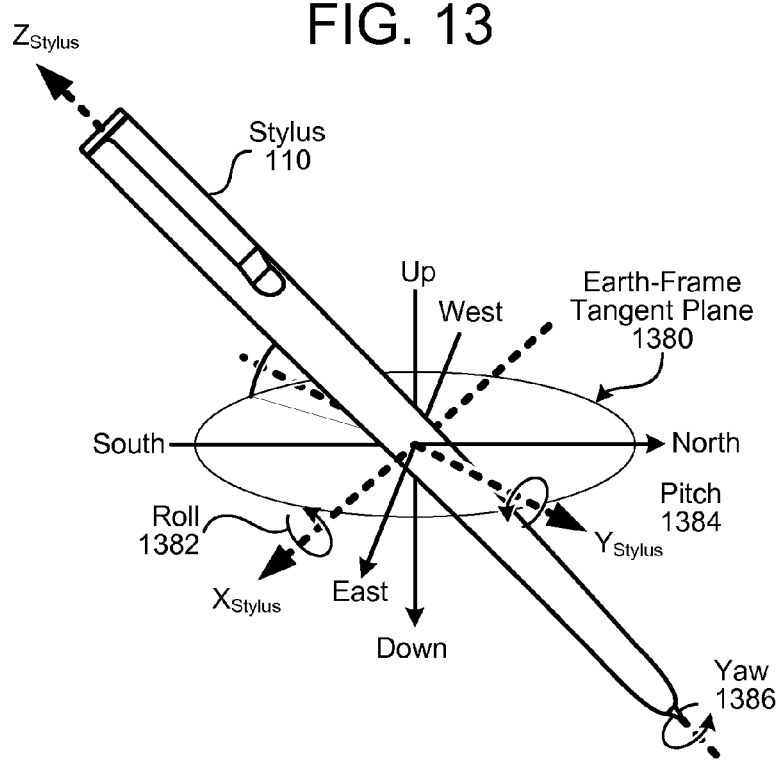
FIGS. 13 and 14 illustrates orientation data for the stylus and the mobile device in an Earth-coordinate reference frame.
Figure 14:
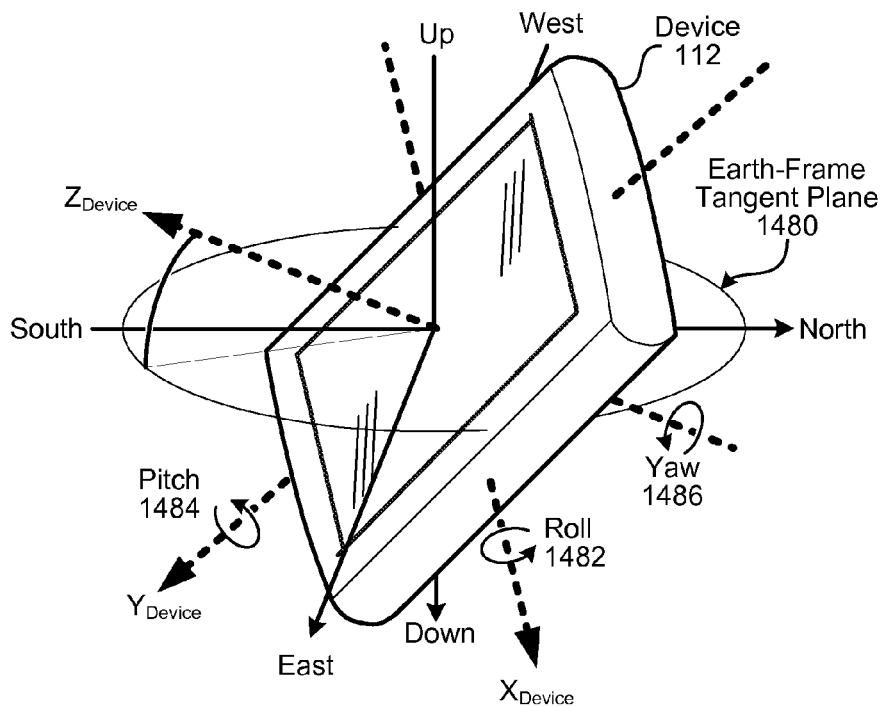

FIGS. 13 and 14 illustrate the stylus 110 and mobile device 112 with gyroscope and magnetometer data in addition to accelerometer data. An inertial filter may "fuse" the data together to determine the directions of each of the stylus and mobile device relative to an Earth coordinate-based reference frame.

North East Down (NED), also known as local tangent plane (LTP), is a geographical coordinate system in an Earth reference frame that is commonly used in aviation, and may be used with IMU. If the direction of an Earth field such as gravity and/or magnetic North is known in the Earth reference frame, a measurement of that same field within the device's sensor frame (x, y, z) will allow a device to determine the orientation of its sensor frame relative to the Earth reference frame, and likewise, the orientation of the Earth reference frame relative to the sensor frame.

The accelerometer data provides acceleration along the x, y, and z axes of the stylus 110 and the mobile device 112. The "down" direction in the Earth reference frame may be determined based on the force of gravity on this acceleration data, as discussed above.

The gyroscope of the stylus 110 provides roll (1382), pitch (1384), and yaw (1386) of the stylus as it rotates around its x, y, and z axes. Likewise, the gyroscope of the mobile device 112 provides roll (1482), pitch (1484), and yaw (1486) of the mobile device as it rotates around its x, y, and z axes. By monitoring roll, pitch, and yaw data since the last time the tip engaged the writing surface, a more detailed determination can be made as to the relative orientation of the stylus and the writing surface.

Magnetometers in the stylus 110 and mobile device 112 can determine the direction of magnetic north in an Earth-frame tangent plane (1380 and 1480 respectively), which are parallel to flat ground. Based on the determination of magnetic north in the Earth reference frame, the relative directions of the stylus and the mobile device can be determined.

Figure 15:
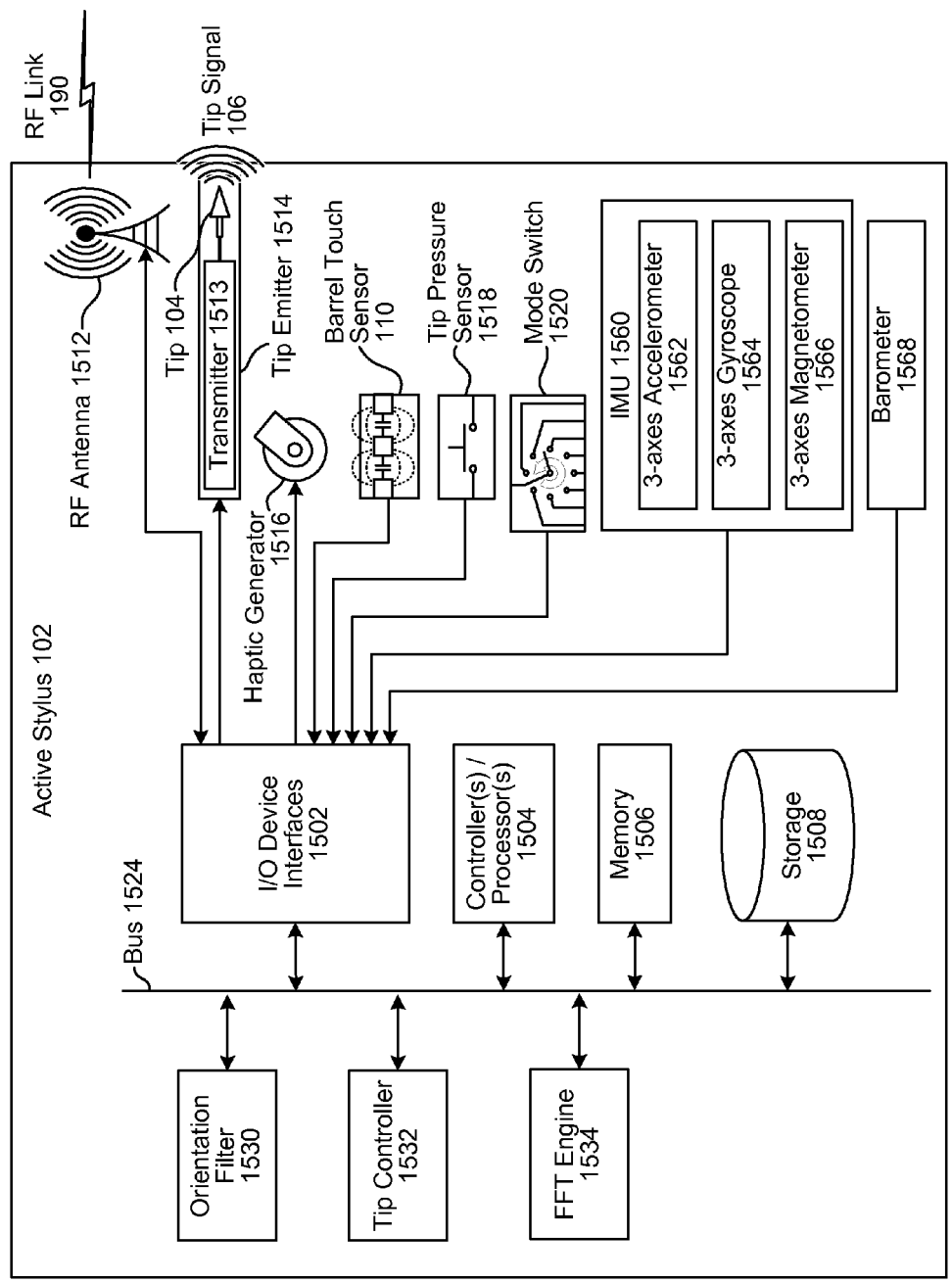
FIG. 15 is a block diagram conceptually illustrating example components of the stylus.

FIG. 15 is a block diagram conceptually illustrating example components of the active stylus 102. In operation, the stylus 102 may include computer-readable and computer-executable instructions that reside in storage 1508 on the stylus 102, as will be discussed further below.

The stylus 102 may include input interfaces such as the barrel touch sensor 110, the tip's pressure sensor 1518, and a rotary mode switch 1520 to change interface modes and settings, and turn the stylus on-and-off. The stylus 102 may also include output interfaces to provide user feedback, such as a haptic effect generator 1516. Other input and output interface components may be included, and illustrated components may be omitted.

The stylus 102 may include an address/data bus 1524 for conveying data among components of the stylus 102. Each component within the stylus 102 may also be directly connected to other components in addition to (or instead of) being connected to other components across the bus 1524.

The stylus 102 may include one or more controllers/processors 1504, that may each include a central processing unit (CPU) for processing data and computer-readable instructions, and a memory 1506 for storing data and instructions. The memory 1506 may include volatile random access memory (RAM), non-volatile read only memory (ROM), non-volatile magnetoresistive (MRAM) and/or other types of memory. The stylus 102 may also include a data storage component 1508, for storing data and controller/processor-executable instructions (e.g., instructions to perform the processes and operations illustrated in FIGS. 1 to 12). The data storage component 1508 may include one or more non-volatile storage types such as solid-state storage, etc.

Computer instructions for operating the stylus 102 and its various components may be executed by the controller(s)/processor(s) 1504, using the memory 1506 as temporary "working" storage at runtime. The computer instructions may be stored in a non-transitory manner in memory 1506 or in storage 1508. Alternatively, some or all of the executable instructions may be embedded in hardware or firmware in addition to or instead of software.

The stylus 102 includes input/output device interfaces 1502. A variety of components may be connected through the input/output device interfaces 1502, such as the tip emitter 1514 that generates the tip signal 106, the haptic effect generator 1516, the barrel touch sensor 110, the tip pressure sensor 1518, and the mode switch 1520. The tip emitter 1514 may be, among other things, a raw antenna element (e.g., top 104) such as a monopole antenna element, coupled to an RF transmitter 1513 controlled via the I/O device interfaces. The RF transmitter 1513 modulates RF energy emanating from the tip 104. the emitted energy to modulate a capacitive field of a digitizer sensor and/or touch sensor of the display of the mobile device 112. The modulation may be, for example, a binary phase-shifted modulation or a frequency modulation. The tip pressure sensor 1518 may be, among other things, an electrically resistive force sensor. The IMU 1560, comprising a 3-axes accelerometer 1562, a 3-axes gyroscope 1564, and a 3-axes magnetometer may also connect through the input/output device interfaces 1502, as well as the barometer 1568.

The input/output device interfaces 1502 may also a wireless communications interface to support the communications link 190 between the stylus 102 and the mobile device 112, such as RF antenna 1512.

The stylus 112 further includes an orientation filter 1530 that collects data from the IMU 1560 and the barometer 1568 to provide orientation, air pressure, and/or height data. The orientation filter provides the "down" vector based on accelerometer data described in equation [1], but may also "fuse" IMU data to provide an indication of changes in orientation of the stylus over time since last engaging in writing on the writing surface 114. The fused data may be relative to the orientation of the stylus when it was last engaged, and/or provide an orientation of the stylus in an Earth coordinate reference system (e.g., FIG. 13).

The tip controller 1532 acquires IMU and barometer data either directly or from the orientation filter 1530 and performs the processing to determine whether to turn on or off the tip signal 106 as described in connection with FIGS. 1 to 12. If using a fast Fourier transform to perform "twiddle" detection (FIG. 12), the tip controller 1532 may use a dedicated FFT Engine 1534. The FFT Engine 1534 may be an FFT algorithm executed by the controller(s)/processor(s) 1504, and may be a dedicated FFT circuit, such as an FFT application-specific integrated circuit (ASIC).

Either the orientation filter 1530 or the tip controller 1532 may periodically save polled IMU data to memory 1506 and/or storage 1508. The tip controller 1532 may likewise save data relating to determined minimum angles/orientations and data relating to determined maximum angles/orientations. This data may be saved after a writing session ends, and may be used to initialize the stylus, calibrate the stylus, and to determine a user's characteristic writing behavior.

FIG. 16 is a block diagram conceptually illustrating example components of the mobile device 112 (e.g., smart phone, tablet computer, etc.). In operation, the mobile device 112 may include computer-readable and computer-executable instructions that reside in storage 1608 on the mobile device 112, as will be discussed further below.

The mobile device 112 may include input interfaces such as a touch sensor 1618 used to detect user interactions with the display 1616, a digitizer sensor 1620 use to detect the stylus' tip signal 106, and a camera 1622. The mobile device 112 may also include output interfaces such as the display 1616 of the writing surface 114. Other input and output interface components may be included, and illustrated components may be omitted. Also, the order of the display 1616, the touch sensor 1618, and the digitizer sensor 1620 as arranged in the writing surface 114 may be in a different order than illustrated. For example, the digitizer sensor 1620 may be arranged in front of the display 1616.

The mobile device 112 may include an address/data bus 1624 for conveying data among components of the mobile device 112. Each component within the mobile device 112 may also be directly connected to other components in addition to (or instead of) being connected to other components across the bus 1624.

The mobile device 112 may include one or more controllers/processors 1604, that may each include a central processing unit (CPU) for processing data and computer-readable instructions, and a memory 1606 for storing data and instructions. The memory 1606 may include volatile random access memory (RAM), non-volatile read only memory (ROM), non-volatile magnetoresistive (MRAM) and/or other types of memory. The mobile device 112 may also include a data storage component 1608, for storing data and controller/processor-executable instructions. The data storage component 1608 may include one or more non-volatile storage types such as solid-state storage, etc.

Computer instructions for operating the mobile device 112 and its various components may be executed by the controller(s)/processor(s) 1604, using the memory 1606 as temporary "working" storage at runtime. The computer instructions may be stored in a non-transitory manner in memory 1606 or in storage 1608. Alternatively, some or all of the executable instructions may be embedded in hardware or firmware in addition to or instead of software.

The mobile device 112 includes input/output device interfaces 1602. A variety of components may be connected through the input/output device interfaces 1602, such as the writing surface 114 and the camera 1622. The IMU 1660, comprising a 3-axes accelerometer 1662, a 3-axes gyroscope 1664, and a 3-axes magnetometer may also connect through the input/output device interfaces 1602, as well as the one or more barometers 1668 (e.g., a barometer at each end of the device 112 relative to the device's long axis).

The input/output device interfaces 1602 may also wireless communications interfaces to support the communications link 190 to the stylus 102 via an RF antenna 1612. Communications with other networks 1699 such as the Internet may be supported by wired or wireless interfaces.

The stylus 112 further includes an orientation filter 1630 that collects data from the IMU 1660 and the barometer 1668 to provide orientation, air pressure, and/or height data. The orientation filter 1630 provides the "down" vector based on accelerometer data described in equation [2] that is relayed to the stylus, and may also "fuse" IMU data to provide an indication of changes in orientation of the writing surface 114 over time since last engaging with the stylus for writing. The fused data may be relative to the orientation of the mobile device when it last engaged with the stylus, and/or provide an orientation of the mobile device in an Earth coordinate reference system (e.g., FIG. 14).

The touch controller 1632 acquires tip signal location data from the digitizer sensor 1620 and touch input location data from the touch sensor 1618. An RF Link Engine 1634 transmits the IMU and barometer data provided by orientation filter 1630 (and/or collected directly from the IMU 1660 and barometer 1668) to the stylus 102 via the RF link 190. The RF Link Engine 1634 may also transmit an indication that the tip signal 106 is received by the Touch Controller 1632.

The concepts disclosed herein may be applied within a number of different devices and computer systems, including, for example, tablet computing systems, laptop computers, cellular phones, personal digital assistants (PDAs), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of stylus-based user interfaces should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, solid-state memory, flash drive, removable disk and/or other media. In addition, one or more components may be implemented as firmware, application specific integrated circuit (ASIC), or as a state machine in hardware. For example, the FFT Engine 1534 maybe a hardware implementation (e.g., an ASIC), and the tip controller may be implemented as a state machine on an specific integrated circuit (ASIC), a field programmable gate array (FPGA), or some combination thereof. Orientation filters 1530, 1630 may also be implemented as an ASIC, and may be implemented in part or in whole in the IMUs 1560, 1660.

As used in this disclosure, the term "a" or "one" may include one or more items unless specifically stated otherwise. Further, the phrase "based on" is intended to mean "based at least in part on" unless specifically stated otherwise. Although angles are described in degrees, radians may also be used.

What is claimed is:

1. An active stylus configured for use with an electronic device, the active stylus comprising:
    a processor;
    an accelerometer;
    a tip including a sensor, the sensor configured to detect contact between the tip and a surface of a touch screen of the electronic device;
    a radio frequency (RF) transmitter coupled to the tip configured to emit a modulated signal to be used by the electronic device to identify a location of the tip on the surface;
    a memory including instruction operable to be executed by the processor to cause the stylus to:
        determine when the tip is in contact with the surface;
        determine when the tip is not in contact with the surface;
        determine a first orientation of the active stylus based on first data from the accelerometer from when the tip is in contact with the surface;
        determine a second orientation of the active stylus based on second data from the accelerometer from when the tip is not in contact with the surface;
        determine a first difference between the first orientation and the second orientation;
        determine that the first difference lies outside of a threshold range;
        deactivate the RF transmitter coupled to the tip based on the first difference lying outside the threshold range;
        determine that the tip is not in contact with the surface after the RF transmitter is deactivated;
        determine a third orientation of the active stylus based on third data from the accelerometer from when the tip is not in contact with the surface after the RF transmitter is deactivated;
        determine a second difference between the first orientation and the third orientation;
        determine that the second difference is within the threshold range; and
        reactivate the RF transmitter coupled to the tip based on the second difference being within the threshold range.

2. The active stylus of claim 1, further comprising a barometer, wherein the instruction are to further configure the processor to:
    determine first barometer data from the barometer from when the tip is in contact with the surface;
    determine second barometer data from the barometer from when the tip is not in contact with the surface;
    determine a third difference between the first barometer data and the second barometer data, the third difference corresponding to a difference between the first barometer data and the second barometer data;
    determine that the third difference exceeds a threshold value, the third difference exceeding the threshold value indicating that it is unlikely that the active stylus is proximate to the touch screen of the electronic device;
    deactivate the RF transmitter;
    determine third barometer data from the barometer from when the tip is not in contact with the surface after the RF transmitter is deactivated;
    determine a fourth difference between the first barometer data and the third barometer data, the fourth difference corresponding to a difference between the first barometer data and the third barometer data;
    determine that the fourth difference is less than the threshold value indicating that it is likely that the active stylus is proximate to the touch screen of the device; and
    reactivate the RF transmitter.

3. A stylus comprising:
    a processor;
    an accelerometer;
    a tip including a sensor, the sensor configured to detect pressure applied to the tip;
    a transmitter coupled to the tip, the transmitter configured to emit a signal via the tip;
    a memory including instructions operable to be executed by the at least one processor to cause the stylus to:
        detect, using the sensor, that pressure is applied to the tip;
        determine a first orientation of the stylus using first accelerometer data;
        detect, using the sensor, that pressure is not applied to the tip;
        determine a second orientation of the stylus using second accelerometer data;
        determine a first difference between the first orientation and the second orientation;
        determine that the first difference is outside a range; and
        deactivate the transmitter.

4. The stylus of claim 3, further comprising a wireless communications interface, wherein to determine the first orientation, the instructions cause the stylus to:
    determine a first direction-of-gravity vector using the first accelerometer data;

receive a second direction-of-gravity vector via the wireless communication interface; and determine the first orientation based on a dot-product of the first direction-of-gravity vector and the second direction-of-gravity vector.

5. The stylus of claim 3, wherein to determine the first orientation, the instructions further cause the stylus to:

determine a first direction-of-gravity vector using the first accelerometer data; and determine the first orientation based on a dot-product of the first direction-of-gravity vector and a vector corresponding to a longitudinal axis of the stylus.

6. The stylus of claim 3, further comprising a barometer, wherein the instructions further configure the stylus to:

determine first barometer data from the barometer from when the sensor indicated pressure is applied to the tip;

determine second barometer data from the barometer from when the sensor did not indicate that pressure is applied to the tip;

determine a second difference between the first barometer data and the second barometer data;

determine that the second difference exceeds a threshold value; and deactivate the transmitter further based on the second difference exceeding a threshold value.

7. The stylus of claim 3, further comprising a wireless communications interface and a barometer, wherein the instructions further configure the stylus to:

determine first barometer data from the barometer from when the sensor indicated pressure is applied to the tip;

receive second barometer data via the wireless communications interface;

determine a second difference between the first barometer data and the second barometer data;

determine third barometer data from the barometer from when the sensor does not indicate that pressure is applied to the tip;

receive fourth barometer data via the wireless communications interface;

determine a third difference between the third barometer data and the fourth barometer data;

compare the second difference and the third difference; and deactivate the transmitter further based on the third difference exceeding the second difference by a threshold value.

8. The stylus of claim 3, further comprising a wireless communications interface and a barometer, wherein the instruction are to further configure the processor to:

determine first barometer data from the barometer from when the sensor indicated pressure is applied to the tip;

receive second barometer data via the wireless communications interface;

determine a second difference between the first barometer data and the second barometer data;

determine third barometer data from the barometer from when the sensor did not indicate that pressure is applied to the tip;

receive fourth barometer data via the wireless communications interface;

determine a third difference between the third barometer data and the fourth barometer data;

compare the second difference and the third difference; and reactivate the emitter based on the third difference being within a threshold value of the second difference.

9. The stylus of claim 3, the instructions further configuring the stylus to:

sample accelerometer data over a series of measurements spanning an interval of time;

compare the samples with each other;

determine that there is repetitive motion with substantial periodicity within a margin of error; and deactivate the emitter based on a determination that the periodicity exceeds a threshold rate.

10. The stylus of claim 9, wherein the determination as to whether there is the respective motion with the substantial periodicity within the margin of error is based on one or more of:

a fast Fourier transform;

peak-valley detection;

the transmitter being repeatedly deactivated and reactivated over the interval of time; or comparison of extremes in the sample over the interval of time.

11. The stylus of claim 3, wherein the instructions further configure the stylus to:

determine a plurality of orientations of the stylus corresponding to different times when the sensor indicated pressure is applied to the tip; and determine the range based on maximum and minimum orientation extremes of the plurality of orientations.

12. A method implemented by a processor on a stylus comprising:

detecting that pressure is applied to a tip of the stylus;

determining a first orientation of the stylus using first accelerometer data from an accelerometer;

detect that pressure is not applied to the tip;

determining a second orientation of the stylus using second accelerometer data from the accelerometer;

determining a first difference between the first orientation and the second orientation;

determining that the first difference is outside a range; and deactivating a signal emitted from the tip.

13. The method of claim 12, further comprising:

determining a first direction-of-gravity vector using the first accelerometer data;

receiving a second direction-of-gravity vector via a wireless communication interface; and determining the first orientation based on a dot-product of the first direction-of-gravity vector and the second direction-of-gravity vector.

14. The method of claim 12, wherein determining the first orientation comprises:

determine a first direction-of-gravity vector using the first accelerometer data; and determining the first orientation based on a dot-product of the first direction-of-gravity vector and a vector corresponding to a longitudinal axis of the stylus.

15. The method of claim 12, further comprising:

determining first barometer data from a barometer of the stylus from when pressure is detected at the tip;

determining second barometer data from the barometer from when pressure is not detected at the tip;

determining a second difference between the first barometer data and the second barometer data;

determining that the second difference exceeds a threshold value; and deactivating the signal emitted from the tip further based on the difference exceeding a threshold value.

16. The method of claim 12, further comprising:

determining first barometer data from a barometer of the stylus from when pressure is detected at the tip;

receiving second barometer data via a wireless communications interface;

determining a second difference between the first barometer data and the second barometer data;
determining third barometer data from the barometer from when pressure is not detected at the tip;
receiving fourth barometer data via the wireless communications interface;
determining a third difference between the third barometer data and the fourth barometer data;
comparing the second difference and the third difference; and
deactivating the signal emitted from the tip based on the third difference exceeding the second difference by a threshold value.

17. The method of claim 12, further comprising:
determining first barometer data from a barometer of the stylus from when pressure is detected at the tip;
receiving second barometer data via a wireless communications interface;
determining a second difference between the first barometer data and the second barometer data;
determining third barometer data from the barometer from when pressure is not detected at the tip;
receiving fourth barometer data via the wireless communications interface;
determining a third difference between the third barometer data and the fourth barometer data;
comparing the second difference and the third difference; and
reactivating the signal emitted from the tip based on the third difference being within a threshold value of the second difference.

18. The method of claim 12, further comprising:
sampling accelerometer data over a series of measurements spanning an interval of time;
comparing the samples with each other;
determining that there is repetitive motion with substantial periodicity within a margin of error; and
deactivating the signal emitted from the tip based on a determination that the periodicity exceeds a threshold rate.

19. The method claim 18, wherein determining whether there is the respective motion with the substantial periodicity within the margin of error is based on one or more of:
a fast Fourier transform;
peak-valley detection;
the signal being repeatedly deactivated and reactivated over the interval of time; or
comparison of extremes in the sample over the interval of time.

20. The method of claim 12, further comprising:
determining a plurality of orientations of the stylus corresponding to different times when the sensor indicated pressure is applied to the tip; and
determining the range based on maximum and minimum orientation extremes of the plurality of orientations.

* * * * *